United States Patent
Zahir

(10) Patent No.: US 10,322,409 B1
(45) Date of Patent: Jun. 18, 2019

(54) LOW TEMPERATURE HYDROTHERMAL METHOD FOR THE PREPARATION OF $LACO_3OH$ NANOPARTICLES

(71) Applicant: King Fahd University of Petroleum and Minerals, Dhahran (SA)

(72) Inventor: Md. Hasan Zahir, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/911,905

(22) Filed: Mar. 5, 2018

(51) Int. Cl.
| | | |
|---|---|---|
| B01J 27/236 | (2006.01) | |
| C01F 17/00 | (2006.01) | |
| B01J 35/00 | (2006.01) | |
| B01J 37/10 | (2006.01) | |
| B01J 37/00 | (2006.01) | |
| B01D 53/94 | (2006.01) | |
| B01D 53/86 | (2006.01) | |
| F01N 3/28 | (2006.01) | |

(52) U.S. Cl.
CPC ........ B01J 27/236 (2013.01); B01D 53/8628 (2013.01); B01D 53/9413 (2013.01); B01J 35/0013 (2013.01); B01J 37/0072 (2013.01); B01J 37/10 (2013.01); C01F 17/005 (2013.01); B01D 2255/2063 (2013.01); C01P 2002/54 (2013.01); C01P 2002/72 (2013.01); C01P 2002/76 (2013.01); C01P 2002/77 (2013.01); C01P 2002/82 (2013.01); C01P 2002/85 (2013.01); C01P 2004/03 (2013.01); C01P 2004/04 (2013.01); C01P 2004/30 (2013.01); C01P 2004/38 (2013.01); C01P 2004/64 (2013.01); F01N 3/2825 (2013.01)

(58) Field of Classification Search
CPC . B01J 27/236; B01J 35/00; B01J 37/10; B01J 37/00; B01J 23/10; B01J 23/02; B01J 2523/23; B01J 2523/3706; C01F 17/00; C01F 17/005; C01F 11/18; B01D 53/94; B01D 53/8628; B01D 53/56; B01D 53/565; B01D 2255/2045; B01D 2255/2063; B01D 2257/404; B82Y 40/00; B82Y 99/00
See application file for complete search history.

(56) References Cited

U.S. PATENT DOCUMENTS

| | | | | |
|---|---|---|---|---|
| 9,999,875 | B2 * | 6/2018 | Peck | B01J 23/002 |
| 2002/0132725 | A1 * | 9/2002 | Labarge | B01J 23/02 502/64 |
| 2010/0160692 | A1 * | 6/2010 | Kourtakis | B01J 23/02 568/902 |
| 2012/0029218 | A1 * | 2/2012 | Kim | B01J 21/06 554/174 |
| 2017/0312742 | A1 * | 11/2017 | Peck | B01J 23/002 |

FOREIGN PATENT DOCUMENTS

| | | | |
|---|---|---|---|
| CN | 102836732 A | 12/2012 | |
| CN | 102671684 B | 10/2013 | |
| CN | 102671685 B | 11/2013 | |
| CN | 102186563 B * | 8/2014 | ........ B01D 53/8628 |
| CN | 107176836 A | 9/2017 | |
| FR | 2897609 A1 * | 8/2007 | .......... B01D 53/945 |
| KR | 101072196 B1 * | 10/2011 | ............. A61K 33/24 |

OTHER PUBLICATIONS

L. Tepech-Carrillo, et al., "Preparation of Nanosized LaCoO₃ through Calcination of a Hydrothermally Synthesized Precursor", Journal of Nanomaterials, vol. 2016, 2016, pp. 1-7.
Yong-Xing Zhang, et al., "Green synthesis of monodispersed $LaCO_3OH$ microgears with novel plum blossom-like structure via a glycerol-mediated solvothermal method", RSC Advances, vol. 5, Issue 28, 2015, pp. 21925-21930.
Dr. Hasan Md. Zahir, et al., "Noble Hydroxide Based Phase Change Materials for Thermal Energy Storage", ASME 2016 International Mechanical Engineering Congress & Exposition, Nov. 11-17, 2016.

* cited by examiner

*Primary Examiner* — Timothy C Vanoy
(74) *Attorney, Agent, or Firm* — Oblon, McClelland, Maier & Neustadt, L.L.P.

(57) ABSTRACT

A hydrothermal method of preparing uniform, monodisperse ceramic lanthanum hydroxyl carbonate ($LaCO_3OH$) having cherry-blossom-like nanogears and/or nanocubes is described. The method produced a hexagonal crystal with a crystal lattice in which at least on lanthanum ion is substituted with calcium ion. The ceramic nanoparticles produced by the method are good catalyst for the reduction of nitrogen oxides with a hydrocarbon. A method of reducing exhaust gases is described.

20 Claims, 13 Drawing Sheets

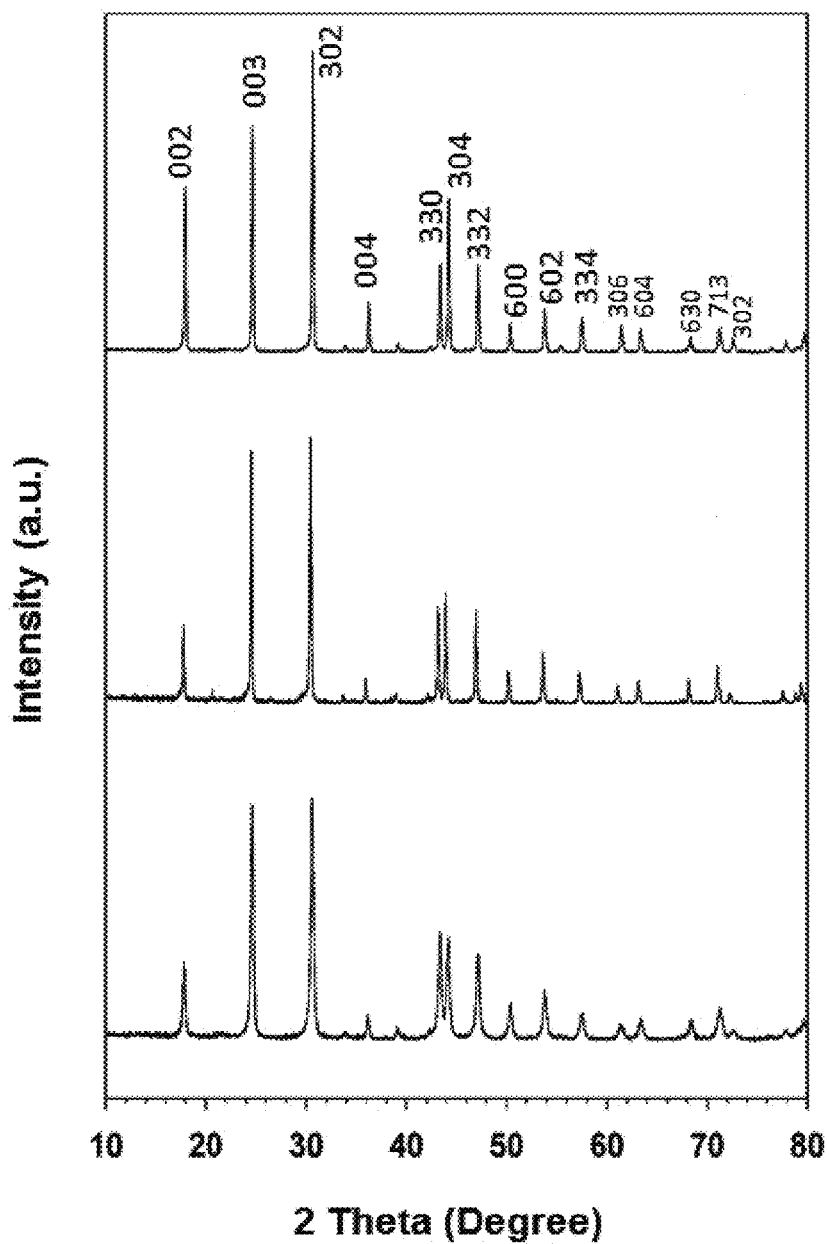

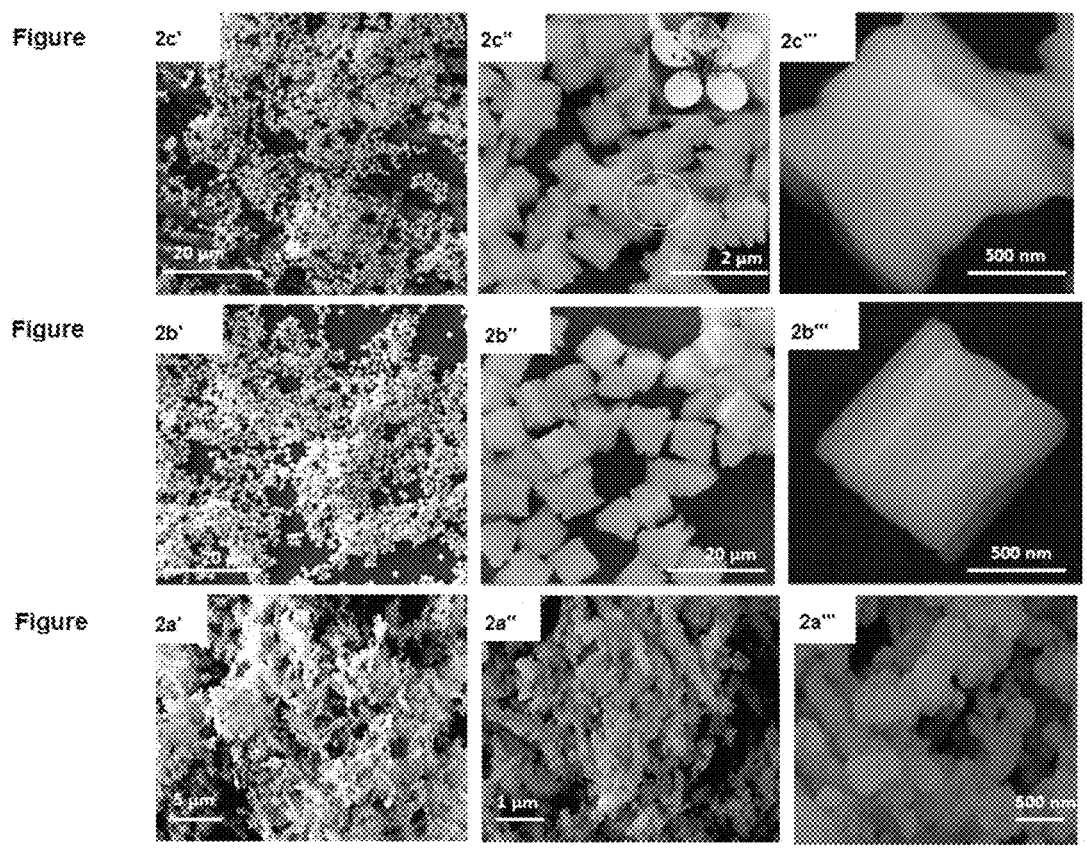

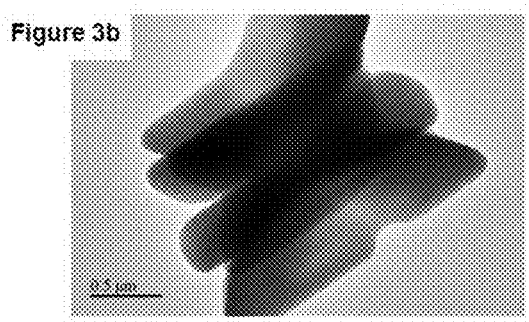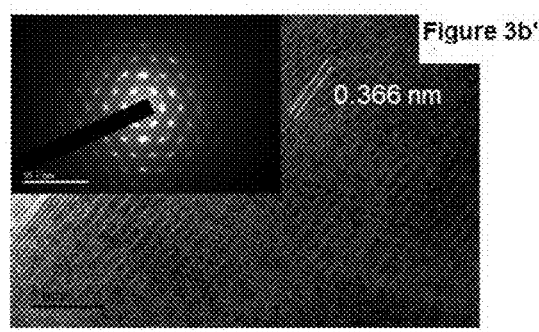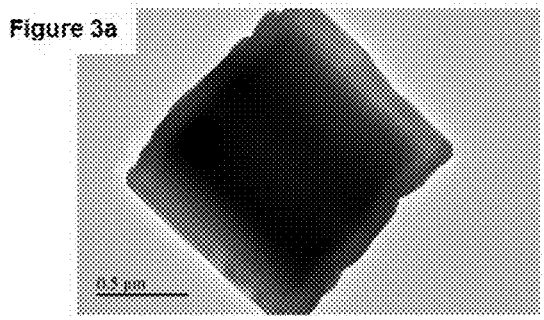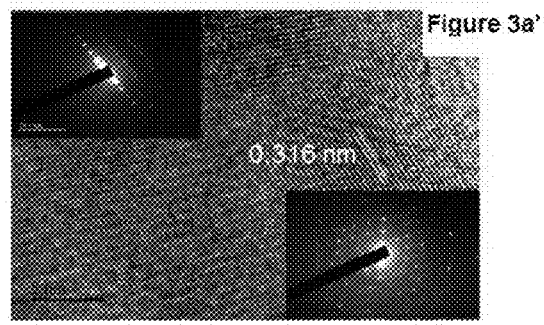

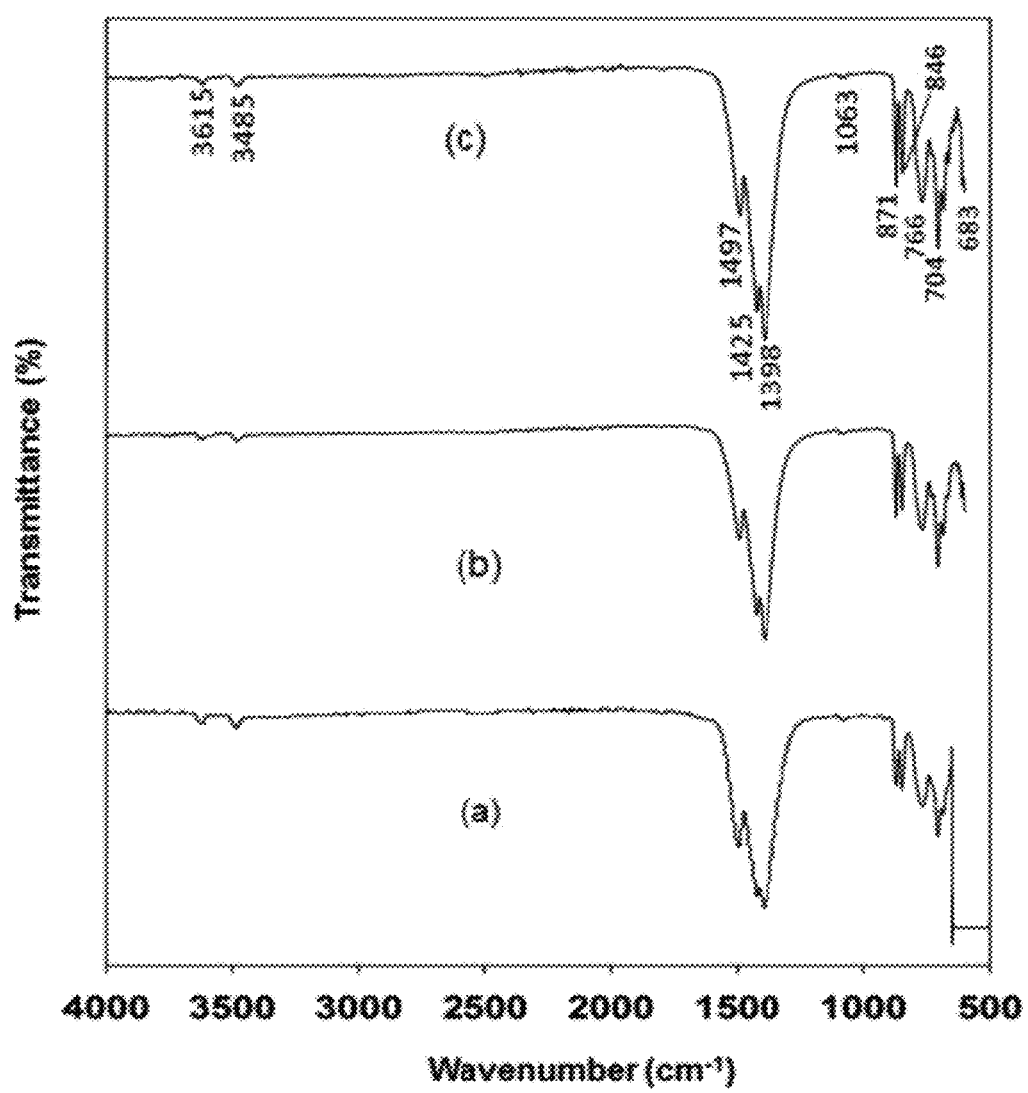

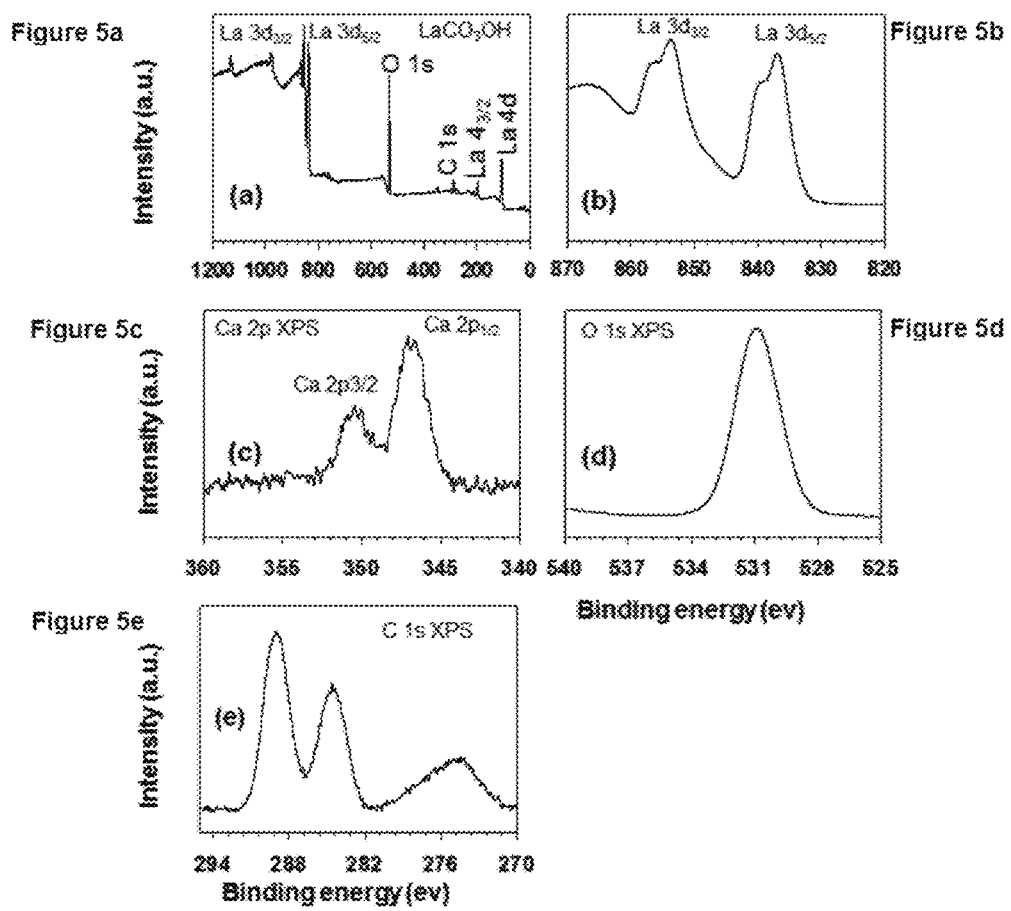

LOW TEMPERATURE HYDROTHERMAL METHOD FOR THE PREPARATION OF LACO$_3$OH NANOPARTICLES

BACKGROUND OF THE INVENTION

Technical Field

The present invention relates to a method of synthesizing nanoparticles of LaCO$_3$OH with a template-free low temperature hydrothermal method.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The large-scale syntheses of nanomaterials with distinct morphologies have attracted tremendous attention because of their excellent performances in optoelectronics devices, sensors, catalysts, solar cells, and magnetic applications [Remskar et al. "Self-assembly of subnanometer-diameter single-wall MoS2 nanotubes" Science 292 (2001) 479-481; and Sharma et al. "Preparation and catalytic applications of nanomaterials: a review" RSC Adv. 5 (2015) 53381-53403]. One major challenge in this field is the development of new routes for morphology-controlled crystal growth. The morphologies of functional materials, particularly their composition, size, and shape, determine their properties. The syntheses of novel micro- and nanoscale materials with new processes and new experimental techniques provide unique opportunities for the development of innovative nanosystems and nanostructured materials.

In comparison with nanowires or carbon nanotubes, reports of nanoflower-like morphologies are very rare [Eaton et al. "Review Article-Semiconductor nanowire lasers" Nat. Rev. Mater. 1 (2016) 16028]. Ayan et al. reported that zinc oxide (ZnO) nanoflowers showed significant pro-angiogenic properties (enhancing formation of new capillaries from pre-existing blood vessels), observed by in vitro and in vivo angiogenesis assays [Barui et al. "Zinc oxide nanoflowers make new blood vessels" Nanoscale, 4 (2012) 7861-7869]. The egg yolk angiogenesis assay using ZnO nanoflowers indicates the presence of matured blood vessels formation [Barui et al. "Zinc oxide nanoflowers make new blood vessels" Nanoscale, 4 (2012) 7861-7869]. Very few reports of metal hydroxides or oxo-salts with nanoflower structures have been published. Recently, Yan et al. prepared Mg(OH)$_2$ nanoflowers with the hydrothermal method by using MgCl$_2$ and CO(NH$_2$)$_2$ without any organic additive or catalyst. Ni(OH)$_2$ nanoflowers have been prepared hydrothermally by using Ni(CH$_3$COO)$_2$.4H$_2$O [Yan et al. "Preparation of Magnesium Hydroxide Nanoflowers" J. Cryst. Growth 282 (2005) 448-454]. In such hydrothermal reactions, a solution needs to be prepared in a mixture of solvents such as ethylene glycol or ethanol and deionized H$_2$O at 200° C. [Yang et al. "Hydrothermal synthesis of nickel hydroxide nanostructures in mixed solvents of water and alcohol" J. Solid State Chem. 180 (2007) 2095-2101]. The synthesis with morphology control of rare earth metal oxides and/or hydroxides and oxide nanoparticles have attracted continued research interest. It has been found that the catalytic activities and optical properties of nanomaterials depend on the morphology of the particles.

CaO is an alkaline-earth oxide that exhibits the optical properties of an insulator, with a wide band gap of 7.03 eV [Whited et al. "Exciton Spectra of CaO and MgO" Phys. Rev. Lett. 22 (1969) 1428], and at the same time acts as a semiconductor, with a high dielectric constant of 11.8 [Yousif et al. "Luminescence and electron degradation properties of Bi doped CaO phosphor, Appl. Sur. Sci. 356 (2015) 1064-1069]. Doped CaO and composites of CaO with rare-earth (RE) cations have been synthesized many times, for example CaO:Tb$^{3+}$[Kuang et al. "Long-Lasting Phosphorescence of Tb$^{3+}$ Doped MO (M=Ca, Sr)—A Review" Chin. J. Inorg. Chem. 21 (2005) 1383-1385], CaO:Eu$^{3+}$[Kang et al. "Preparation and properties of red phosphor CaO:Eu$^{3+}$" J. Mater. Sci. 44 (2009) 2388-2392], and CaO:Sm$^{3+}$ [Prakash, K. R. Thermoluminescence properties of gamma irradiated CaO:Sm$^{3+}$ phosphor, Nuclear Instruments and Methods, Nagabhushana, Nuclear Instruments and Methods in Physics B 379 (2016) 136-140]. When a divalent metallic ion is substituted and/or incorporated into a host lattice of trivalent metallic ions, the formation of essential defects such as calcium and oxygen vacancies can occur due to unbalanced charge compensation. These defects play crucial roles in the luminescence intensity of these materials. Among the many rare earth (RE) cation-doped luminescent materials, Y$_2$O$_3$[Yang et al. "Y$_2$O$_3$:Eu3+ Microspheres: Solvothermal Synthesis and Luminescence Properties" J. Cryst. Growth Des. 7 (2007) 730-735], YBO$_3$ [Sohn et al. "Photoluminescence Behavior of Tb$^{3+}$-Activated YBO$_3$ Phosphors" J. Electrochem. Soc. 147 (2000) 1988-1992], and YVO$_4$ [Hou et al. "Preparation and Luminescence Properties of YVO$_4$:Ln and Y(V, P)O$_4$:Ln (Ln=Eu$^{3+}$, Sm$^{3+}$, Dy$^{3+}$) Nanofibers and Microbelts by Sol-Gel/Electrospinning Process" Chem. Mater. 20 (2008) 6686-6696] are well-established host luminescent materials because of their high chemical stability and suitable crystal structure.

There have been very few reports of rare-earth hydroxycarbonates with novel morphologies, and this is particularly true for LaCO$_3$OH. The only published reports are as follows: LaCO$_3$OH with double-decker-like microhexagrams [Li et al. "Eu$^{3+}$/Tb$^{3+}$-Doped La$_2$O$_2$CO$_3$/La$_2$O$_3$ Nano/Microcrystals with Multiform Morphologies: Facile Synthesis, Growth Mechanism, and Luminescence Properties" Inorg. Chem. 49 (2010) 10522-10535], spiky balls and triangular hearts [Yang et al. "LaCO$_3$OH microstructures with tunable morphologies: EDTA-assisted hydrothermal synthesis, formation mechanism and adsorption properties" RSC Adv. 3 (2013) 3907-3916], apple-like nanostructures [Zhong et al. "Gelatin-mediated hydrothermal synthesis of apple-like LaCO$_3$OH hierarchical nanostructures and tunable white-light emission, Cryst. Eng. Comm. 13 (2011) 4151-4160], microspheres [Zhang et al. "Synthesis, Characterization, and Photoluminescence Property of LaCO$_3$OH Microspheres" Inorg. Chem. 46 (2007) 4713-4717], nanowires [Li et al. "Synthesis of LaCO$_3$OH nanowires via a solvothermal process in the mixture of water and room-temperature ionic liquid" Mater. Lett. 59 (2005) 963-965], and the layer-by-layer self-assembly of nanoplates [Xie et al. "Biomolecular-Induced Synthesis of Self-Assembled Hierarchical La(OH)CO$_3$ One-Dimensional Nanostructures and Its Morphology-Held Conversion toward La$_2$O$_3$ and La(OH)$_3$," Cryst. Growth Des. 9 (2009) 3889-3897].

Nanoflower-type materials have been fabricated and/or synthesized hydrothermally and electrochemically via the reduction of metal salts, the oxidation of elemental metals, and thermal decomposition. The morphology of the nanoflowers depends on the reagent ratio, temperature, and reaction time. Most syntheses of LaCO$_3$OH have been performed with the assistance of templates or catalysts, which usually yield undesirable by-products, complicate the reaction mechanism, and are very difficult to remove from the final product, which increases the production costs. Moreover, the final products are usually pure orthorhombic phase LaCO$_3$OH, which is not as stable as LaCO$_3$OH with a pure hexagonal structure [Liu et al. "Self-Assembled CuO Monocrystalline Nanoarchitectures with Controlled Dimensionality and Morphology" Cryst. Growth Des. 6 (2006) 1690-1696]. Recently, Zhang et al. prepared LaCO$_3$OH nanogears with a novel cherry-blossom-like structure with the assistance of glycerol via a solvothermal synthesis route [Zhang et al. "Green synthesis of monodispersed LaCO$_3$OH microgears with novel plum blossom-like structure via a glycerol-mediated solvothermal method, RSC Adv. 5 (2015) 21925-21950]. Among the environmental pollutants are nitrogen oxides (NO$_x$=NO+NO$_2$) and their concentration in the environment is increasing due to rapid urban development, industrialization and the large numbers of vehicles which utilize fossil fuel for energy [Bosch et al. "Catalytic reduction of nitric oxides—a review of the fundamentals and technology" Catal. Today 2, (1988) 369-521]. As results, serious environmental problems for example global warming, photochemical smog and air pollution have occurred. Prolonged exposure to NO$_x$ is associated with respiratory ailments such as violent coughing, difficulty in breathing, and cyanosis, which can be fatal. Also, NOx is thought to produce toxic ozone in the environment through a photochemical process mediated by ultraviolet light from sunlight. Moreover, NOx in the environment is a major contributor to the formation of acid rain leading to acidic water in lakes, rivers, and soil [Baird et al. Chann, (eds.): Environmental Chemistry, Fourth ed, pp. 145-173, W.H. Freeman and Company, New York (2008)].

Therefore, reduction of NOx is essential to improve the quality of the environment for both human and wild-life. Several research groups have examined the catalytic reduction of NOx by zeolite catalysts. Zeolites, however, are not suitable for selective catalytic reduction (SCR) of NOx by HC (hydrocarbon) because of their instability in the presence of H$_2$O vapor. H$_2$O is one of the main components of exhaust gases [S. Matsumoto "Recent advances in automobile exhaust catalysts" Catal. Today 90 (2004) 183-190]. Similarly, three-way catalysts are found to be ineffective in the reduction of NOx under oxygen-rich conditions [See S. Matsumo]. While a catalytic method for decomposition of NOx is highly desirable, very few catalysts are known to be able to convert NO directly to N$_2$.

Currently, NO reduction by ethylene, propane, propylene, and n-octane hydrocarbons have been investigated in presence of O$_2$ [Zhiming et al. "Advances in catalytic removal of NOx under lean-burn conditions" Chinese Sci. Bull., 49 (2004) 2231-2241]. In this regard, methane is a good candidate as a reducing agent for NOx, but the reaction requires high temperature due to high energy required to activate a C—H bond for reaction [Vannice et al. "The Kinetics of NO, Decomposition and NO Reduction by CH$_4$ over La$_2$O$_3$ and Sr/La$_2$O$_3$" J. Catal. 159 (1996) 119-126]. It is highly desirable to use CH$_4$ as a reducing agent because of its low cost and availability in large quantities. Thus, a catalyst capable of catalyzing the reduction of NOx with CH$_4$ at relatively high temperatures would be highly desirable. The SCR of NO with CH$_4$ has been examined, and it was suggested that an increase in methyl radical concentration might enhance the reaction activities. It is thought that the catalytic reduction of NO by methane proceeds by oxidative coupling mechanism [Davies et al. "Association reaction of CH$_3$ and NO: evidence for the involvement of the triplet surface" Chem. Soc. Faraday Trans. 87 (1991) 2317-2324]. Actually, the reaction mechanism of NO reduction with CH$_4$ in the presence of oxygen over metal oxide remains unclear.

Fokema and Ying ["The selective catalytic reduction of nitric oxide with methane over scandium oxide, yttrium oxide and lanthanum oxide" App. Catal. B: Envi. 18 (1998) 71] have tested the catalytic activity of Y$_2$O$_3$, Sc$_2$O$_3$, and La$_2$O$_3$ oxides with CH$_4$ in the presence of O$_2$. Among the tested catalysts, La$_2$O$_3$ performed extremely well with a catalytic activity similar to that of Co-ZSM5 in the presence oxygen with CH$_4$. Moreover, specific activities reported for La$_2$O$_3$, Sr/La$_2$O$_3$, and CaO are found to be similar or higher. Recently, Fliatoura et al. reported NO reduction of pure CaO [Fliatoura et al. "Selective Catalytic Reduction of Nitric Oxide by Methane in the Presence of Oxygen over CaO Catalyst" J. Catal. 183 (1999) 323-335], La$_2$O$_3$—CaO mixed oxides [Costa et al. "The Selective Catalytic Reduction of Nitric Oxide with Methane over La$_2$O$_3$—CaO Systems: Synergistic Effects and Surface Reactivity Studies of NO, CH$_4$, O$_2$, and CO$_2$ by Transient Techniques" J. Catal. 194 (2000) 250-265], in presence of oxygen with CH$_4$. Anastasiadou et al. reported that doping La$_2$O$_3$ into Ca$^{2+}$ system significantly enhances the NO reduction by CH$_4$ in the presence of O$_2$ compared to pure La$_2$O$_3$ and CaO alone [Anastasiadou et al. "Understanding the Synergistic Catalytic Effect between La$_2$O$_3$ and CaO for the CH$_4$ Lean, De-NOx Reaction: Kinetic and Mechanistic Studies" J. Phys. Chem. B 109 (2005) 13693-13703]. Also, the same phenomenon was observed after doping of CaO into La$^{3+}$ ions. The inventors have reported Ca—Sm—Sn—Ni—O mixed SnO$_2$ and CeO$_2$ oxidic systems for NO reduction in presence of oxygen with CH$_4$, C$_2$H$_4$ and C$_3$H$_6$ [Zahir et al. "Hydrothermal synthesis of Sr—Ce—Sn—Mn—O mixed oxidic/stannate pyrochlore and its catalytic performance for NO reduction, Mater. Chem. Phy. 116 (2009) 273-278]. It has been reported that a mixed phases of metal oxide systems show much better performance than that of single phase. Mixed phases are also very effective in enhancing the NO reduction activity [Zahir et al. "Hydrothermal Synthesis of New Compounds with the Pyrochlore Structure and Its Application to Nitric Oxide Abatement, J. Cera. Soc. Jap. 110 (2002) 963-969]. The above-mentioned CaO alone or La$_2$O$_3$—CaO mixed oxides powders have been prepared by co-precipitation method and the mixed sample had very low surface area due to large grains size. Usually mixed oxides powders synthesized by co-precipitation method show rough morphology with non-homogeneous particles [Aguilar-Rios et al. "Hydrogen interactions and catalytic properties of platinum-tin supported on zinc aluminate" Appl. Catal A 127 (1995) 65-75]. On the other hand, hydrothermally synthesized powders are soft agglomerates of high-purity and homogeneous and can be synthesized at low temperature [W. J. Dawson, Hydrothermal synthesis of advanced ceramic powders. Am. Ceram. Soc. Bull. 67 (1988)1673-1678].

In view of the foregoing, one objective of the present invention is to provide LaCO$_3$OH nanocubes or nanogears with a cherry-blossom-like structure and their use in the reduction of NO.

BRIEF SUMMARY OF THE INVENTION

The instant invention is related to a ceramic nanoparticle comprising lanthanum hydroxycarbonate with a crystal lattice structure, wherein at least one lanthanum cation of the crystal lattice structure is substituted with a calcium cation and a method of making the same.

A first aspect of the invention is directed to a method of fabricating a lanthanum hydroxycarbonate with a crystal lattice structure, wherein at least one lanthanum cation of the crystal lattice structure is substituted with a calcium cation, said method involves hydrothermally treating an aqueous hydrothermal reaction mixture comprising a calcium salt, a lanthanum salt, and ammonium carbonate at a temperature of 120 to 250° C. for a time of 12-60 hours to form the ceramic nanoparticle, wherein a molar ratio of lanthanum to calcium is in the range of 80:20 to 99:1.

In some embodiments of the method, the aqueous hydrothermal reaction mixture does not contain a templating agent or a catalyst, and wherein the aqueous hydrothermal reaction mixture has a pH in the range of 7.5 to 10.0, preferably 8.0-8.5.

In some embodiments of the method, the molar ratio of lanthanum to calcium is 95:5.

In some embodiments of the method, the hydrothermal treatment is carried out at a temperature of 150-200° C., and most preferably at 180° C.

In some embodiments of the method, the time of treatment is selected from the group consisting of 12 hours, 24 hours, and 48 hours. The most preferred time of treatment is 48 hours.

In the most preferred embodiment of the method, the molar ratio of lanthanum to calcium is 95:5, the temperature is 180° C., and the time is 48 hours.

A second aspect of the invention is directed to a ceramic nanoparticle of lanthanum hydroxycarbonate with a crystal lattice structure, wherein the ceramic nanoparticle is produced by a method comprising:

hydrothermally treating an aqueous hydrothermal reaction mixture comprising a calcium salt, a lanthanum salt, and ammonium carbonate at a temperature of 120 to 250° C. for a time of 12-60 hours to form the ceramic nanoparticle, wherein a molar ratio of lanthanum to calcium is in the range of 80:20 to 99:1.

A preferred embodiment of ceramic nanoparticles, the nanoparticle is formed in the aqueous hydrothermal reaction mixture which does not contain a templating agent or a catalyst, and wherein the aqueous hydrothermal reaction mixture has a pH in the range of 7.5 to 10.0, and more preferably, has a pH 8.0-8.5.

Another preferred embodiment, the ceramic nanoparticle is formed in an aqueous hydrothermal reaction mixture wherein the molar ratio lanthanum to calcium is selected from the group consisting of 80:20, 85:15, 90:10, and 95:5.

Another preferred embodiment, the ceramic nanoparticle is formed by the hydrothermal treatment at a temperature of 150-200° C., 160-190° C., and most preferably at 180° C.

Another preferred embodiment, the ceramic nanoparticle is formed by the hydrothermal treatment wherein the time of treatment is selected from the group consisting of 12 hours, 24 hours, and 48 hours. The most preferred time of treatment is 48 hours.

Another preferred embodiment, the ceramic particle contains a hexagonal crystal lattice. In a more preferred embodiment, the crystal lattice has unit cell dimension of a=b=1.26±0.16 nm and c=1.00±0.1 nm.

In the most preferred embodiment, the ceramic nanoparticle is formed by the hydrothermal treatment wherein the molar ratio of lanthanum to calcium is 95:5, the temperature is 180° C., and the time is 48 hours.

A third aspect of the invention is ceramic nanoparticles of lanthanum hydroxycarbonate, wherein at least one lanthanum cation of the crystal lattice structure is substituted with a calcium cation, having a phase structure of a pure hexagonal $LaCO_3OH$ phase.

A preferred embodiment of the invention, the ceramic nanoparticles of lanthanum hydroxylcarbonate have a morphology selected from the group consisting of a flower-like morphology, a nanogear morphology, and a nanocubic morphology.

The most preferred embodiment of the invention, the ceramic nanoparticles have a nanogear morphology.

A fourth aspect of the invention is directed to a method of catalytically reducing a nitrogen oxide in the presence of the ceramic nanoparticles, the method comprising:

passing a gaseous stream comprising nitrogen oxide and at least one gas selected from the group consisting of methane, propane, oxygen, water vapor, helium, air, and combination thereof through the ceramic nanoparticles at a temperature of 200 to 800° C., thereby reducing the nitrogen monoxide.

In preferred embodiment, the nitrogen oxide is selected from the group consisting of NO, $NO_2$, and mixture thereof.

In the most preferred embodiment is a method of catalytically reducing nitrogen oxides in exhaust gas, said method comprising contacting the exhaust gas with the ceramic nanoparticles of $LaCO_3OH$ and a hydrocarbon selected from the group consisting of methane, ethane, and propane at a temperature of 200 to 800° C., thereby reducing the nitrogen oxide.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 1a-1c. FIG. 1a is the X-ray diffraction (XRD) patterns of as-synthesized LC-12 sample, FIG. 1b is the XRD of LC-24 sample, and FIG. 1c is the XRD of LC-48 samples. All samples prepared by the hydrothermal method at 180° C. at pH 8.5 with a molar ratio of La:Ca=95:5.

FIGS. 2a'-2c'''. FIGS. 2a', 2a'', and 2a''' are three magnification of field emission scanning electron microscopy (FESEM) images of the LC-12 sample; FIGS. 2b', 2b'', and 2b''' are three magnification of FESEM LC-24; and FIGS. 2c', 2c'', and 2c''' are three magnification of FESEM LC-48; from low to high magnification, respectively. The inset in (c'') is a digital photograph of a real cherry blossom.

FIGS. 3a-3b'. FIG. 3a A transmission electron microscopy (TEM) image of LC-24 and FIG. 3a' the corresponding a high resolution TEM (HRTEM) image with the selected area electron diffraction (SAED) image in the inset; FIG. 3b TEM image of LC-48 and FIG. 3b' the corresponding HRTEM image with the SAED image in the inset.

FIG. 4. FTIR spectra of as-synthesized (4a) LC-12, (4b) LC-24, and (4c) LC-48 samples.

FIGS. 5a-5e. Typical X-ray photoelectron spectroscopy (XPS) spectra of as-synthesized LC-48: FIG. 5a survey spectrum, FIG. 5b the La 3d region, FIG. 5c the Ca 2p region, FIG. 5d the O 1s region, and FIG. 5e the C is region.

FIG. 6a is the FESEM image of LC-90:10; FIG. 6b is the FESEM image LC-85:15; and FIG. 6c) LC-80:20 is the FESEM image and their corresponding XRD patterns; the samples were prepared with the hydrothermal method at 180° C. for 24 h at pH 8.5.

FIG. 13a is the XRD pattern of LC-24 sample; FIG. 13b is the XRD patterns of LC-24 sample calcined at 800° C. for 2 h, and FIG. 13c is the XRD patterns La—Ca-80-20 sample calcined at 800° C. for 2 h.

DETAILED DESCRIPTION OF THE EMBODIMENTS

Figures 6A, 6B, 6C:
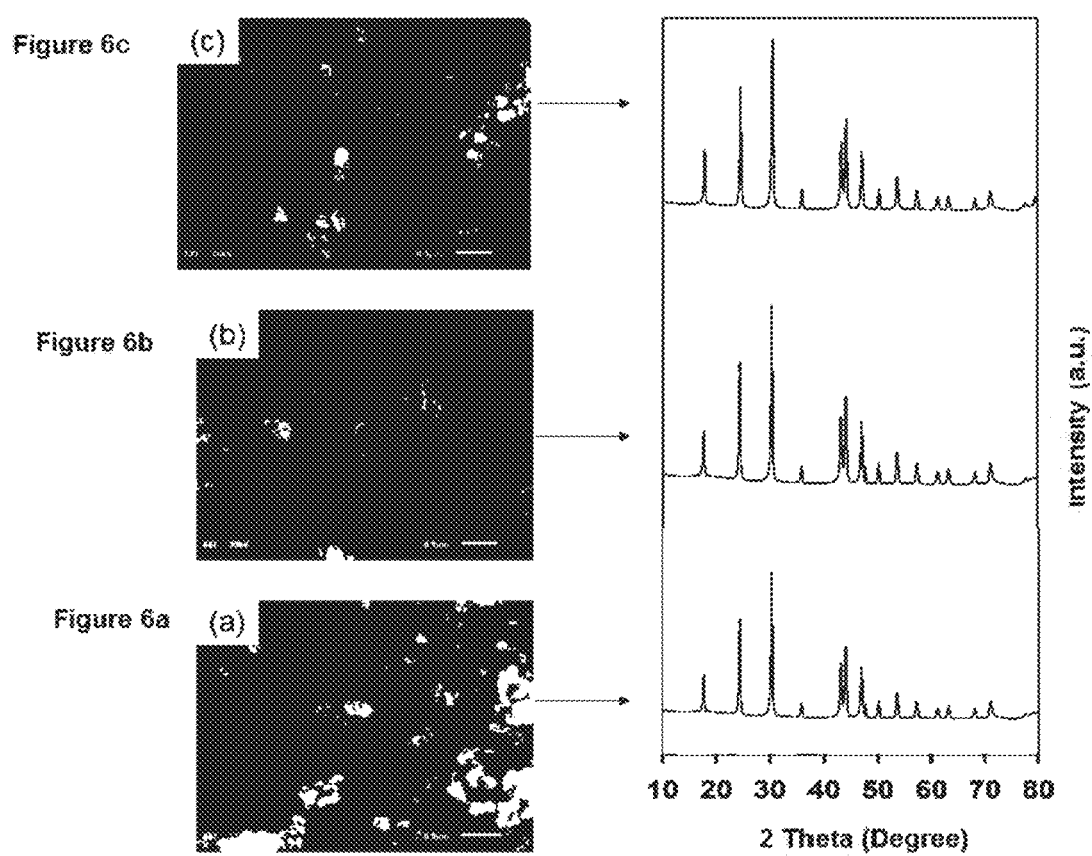
FIGS. 6a-6c.

Embodiments of the present disclosure will now be described more fully hereinafter with reference to the accompanying drawings, in which some, but not all embodiments of the disclosure are shown.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

The present disclosure will be better understood with reference to the following terms and meanings set forth below. Unless defined otherwise, all technical and scientific terms used herein have the same meaning as commonly understood to one of ordinary skill in the art.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, a "composite" is intended to refer to a solid material comprising more than one phase and/or compound.

As used herein, a "nanocomposite" is intended to refer to a composite wherein the phase and/or compound domains have one or more dimensions of 100 nanometers (nm) or less, and/or repeat distances of 100 nm or less.

The term "multiphasic," as used herein, refers to a compound comprising two or more types of amorphous and/or crystalline phases. Biphasic compounds and triphasic compounds may be referred to as multiphasic compounds.

The term "alkyl", as used herein, unless otherwise specified, refers to a saturated straight, branched, or cyclic, primary, secondary, or tertiary hydrocarbon of typically C1 to C8, and specifically includes methyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, and octyl. The term optionally includes substituted alkyl groups. Moieties with which the alkyl group can be substituted are selected from the group consisting of hydroxyl, amino, halogen, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

The present disclosure is intended to include all isotopes of atoms occurring in the present compounds and complexes. Isotopes include those atoms having the same atomic number but different mass numbers. By way of general example and without limitation, isotopes of hydrogen include deuterium and tritium. Isotopes of carbon include $^{13}C$ and $^{14}C$. Similarly, lanthanum isotopes include the stable and most abundant isotope $^{139}La$ and the radioactive $^{138}La$, $^{137}La$, and $^{140}La$ as well as all other 35 short lived isotopes $^{117-136\ and\ 140-155}La$. Also, calcium has several known stable isotopes including $^{40}Ca$, $^{42}Ca$, $^{43}Ca$, $^{44}Ca$, and $^{46}Ca$ as well as unstable isotopes including $^{41}Ca$, $^{45}Ca$, $^{47}Ca$, and $^{48}Ca$. Isotopically-labeled compounds of the disclosure can generally be prepared by conventional techniques known to those skilled in the art or by processes analogous to those described herein, using an appropriate isotopically-labeled reagent in place of the non-labeled reagent otherwise employed.

According to first aspect, the present disclosure relates to a method of fabricating a ceramic nanoparticle of lanthanum hydroxycarbonate with a crystal lattice structure, wherein at least one lanthanum cation of the crystal lattice structure is substituted with a calcium cation. Said nanoparticle has a morphology selected from the group consisting of flower like morphology, a nanogear morphology, and a nanocubic morphology. The method comprises hydrothermally treating a reaction mixture of aqueous solution comprising a calcium salt, a lanthanum salt, and ammonium carbonate at a temperature of 150 to 250° C. for 12-60 hours to form the ceramic nanoparticle, wherein a molar ratio of lanthanum to calcium is in the range of 80:20 to 99:1.

One of ordinary skill in the art would appreciate that any organic or inorganic salt of lanthanum and/or calcium can be used as a reaction mixture in the method. For example, lanthanum or calcium nitrate, nitrite, sulfate, or halides such as fluoride, chloride, bromide, or iodide or mixtures thereof can be utilized in the method. Also, lanthanum and calcium salts of organic acids such as formic acid, acetic acid, propionic acid, butyric acid, oxalic acid, tartaric acid, lactic acid or citric acid may be used. In a preferred embodiment, the salts are inorganic salts selected from the group consisting of lanthanum and/or calcium nitrate, nitrite, sulfate, or halides such as fluoride, chloride, bromide, or iodide or mixture thereof. In the most preferred embodiment, salts are lanthanum nitrates and calcium nitrate. The salts can be hydrated or non-hydrated and when solvated may contain organic solvent such as methanol, ethanol, or acetonitrile. More than one lanthanum or calcium salts may be used in the method.

The molar ratio of lanthanum salt to calcium salt can vary depending on the desired ceramic nanoparticle morphology and characteristics. In one embodiment the molar ratio is 80:20, 85:15, 90:10, 91:9, 92:8, 93:7, 94:6, 95:5, 96:4, 97:3, 98:2, or 99:1, or any intermediate ranges there between. In a preferred embodiment, the molar ratio ranges from 90:10 to 99:1. In the more preferred embodiment, the molar ratio is 80:20, 85:15, 90:10, 93:7, 94:6, 95:5, 96:4, or 97:3. In the most preferred embodiment, the molar ratio is 95:5.

The fabrication method of the nanoparticle may be carried out on any scale as long as the lanthanum salt and calcium salt are dissolved in water. Lanthanum salts and calcium salts have similar solubility in water. For example, the solubility of both lanthanum nitrate and calcium nitrate are about 136 g/100 ml at ambient temperature. So, the method can be carried out on a laboratory scale, i.e., <1 g of lanthanum nitrate in a volume ranging from 1-15 ml, or on much larger scale of up to 1.36 kg in a volume of one liter and multiples thereof. Any carbonate or bicarbonate salt of ammonia or amines can be employed. Examples of the carbonate or bicarbonate salts to be used are ammonium carbonate, ammonium bicarbonate, alkyl, dialkyl, or trialkylammonium carbonate or bicarbonate wherein the alkyl group is an optionally substituted methyl, ethyl, propyl, isopropyl, butyl, aryl or heteroaryl. In a preferred embodiment, ammonium carbonate and/or ammonium bicarbonate is added to the mixture. The amount of carbonate salt should be added to the reaction mixture in sufficient quantity to allow the co-precipitation of the metal ions and it can be added in large molar excess to the lanthanum salt. The carbonate salt may be added to the reaction mixture in molar equivalent to the lanthanum salt or in the range of 1-100 times, 5-50 times, 10-40 times, or 20-30 times the molar amount of the lanthanum salt. The reaction mixture is maintained at a pH between 7.0-10.0, preferably between 7.5-9.5, more preferably between 8.0-9.0, and even more preferably between 8.0-8.5. In the most preferred embodiment, the pH of the reaction mixture is maintained at 8.0 by adding acid or base. The water used in the reaction mixture may be tap water, distilled water, twice distilled water, deionized water, deionized distilled water, reverse osmosis water, and/or some other water. In one embodiment the water is twice distilled to eliminate trace metals. Preferably the water is twice distilled, deionized, deionized distilled, or reverse osmosis water and at 25° C. has a conductivity at less than 10 µS·cm$^{-1}$, preferably less than 1 µS·cm$^{-1}$, a resistivity greater than 0.1 MΩ·cm, preferably greater than 1 MΩ·cm, more preferably greater than 10 MΩ·cm, a total solid concentration less than 5 mg/kg, preferably less than 1 mg/kg, and a total organic carbon concentration less than 1000 µg/L, preferably less than 200 µg/L, more preferably less than 50 µg/L.

The reaction mixture may be sonicated for at least 20 minutes, preferably at least 40 minutes, more preferably at least 60 minutes, using a sonication bath or a sonication probe to produce a sonicated mixture prior to the hydrothermal treatment. Alternatively, the mixture may not be sonicated but instead mixed, stirred, rocked, and/or agitated for an equivalent amount of time. In an alternative embodiment, the mixture may only be mixed to form a homogeneous mixture, and then left to sit for the previously mentioned amount of time.

The sonicated mixture may be aged, or left to sit unperturbed, for at least 12 h, preferably at least 24 h, more preferably at least 48 h at 18-37° C., preferably 20-30° C., more preferably 21-27° C. In an alternative embodiment, the sonicated mixture may be mixed, stirred, rocked, and/or agitated for an equivalent time and at an equivalent temperature.

The temperature of the hydrothermal treatment can vary between 150 to 250° C., preferably 160 to 200° C., more preferably 170 to 190° C., and even more preferably 180 to 185° C. In the most preferred embodiment, the temperature maintained at 180° C. Also, the duration of the hydrothermal treatment can vary between 12-72 h, preferably 12-60 h, and more preferably 12-48 h. In the most preferred embodiment, the duration of the hydrothermal treatment is selected from the group consisting of 12, 20, 24, and 48 hours.

One main advantages of the hydrothermal method described herein are that the ceramic nanoparticle is formed without the assistance of a template or catalyst at relatively low temperature and coast with well-defined morphology. Another advantage is that the method produced the more stable hexagonal crystal lattice of $LaCO_3OH$ in which at least one lanthanum ion is replaced with calcium ion. As used herein, the term "template" refers to as a structure directing agent and is stable under hydrothermal aging conditions and furthermore hydrophobic relative to the metal salts. Many templates used in the manufacturing nanoparticles are known in the art. They include all types of surfactants including anionic surfactants, cationic surfactants, and neutral surfactants. The surfactant may act as a nucleation site for the formation of the nanoparticles. Alkyl ammonium salts are commonly used as templates to form structures in solution that interacts with the inorganic material in solution and serve as a template for the growth of nanoparticles. A commonly used template is tetrapropylammonium hydroxide, tetraethylammonium hydroxide, tetrabutylammonium hydroxide, or tetrapentylammonium hydroxide. Other known templates include cetyl trimethylammonium bromide, cetyl triethylammonium bromide, or dodecyl triethylammonium bromide, Pluronic F127, Pluronic P123, Brij-56, or Brij-30. The template is usually decomposed during calcining at temperatures in the range 545-600° C. for 6-10 hours. Similarly, the term "catalyst" in the context of nanoparticle formation refers to any organic or inorganic molecule(s) or combination thereof that enhances or accelerates the formation of nano-particles. Examples of such a catalyst include, but are not limited to polyols such as ethylene glycol, glycerol, polyethelenegly-col (PEG), and urea.

A second aspect of the invention is the ceramic nanoparticle of lanthanum hydroxycarbonate with a crystal lattice structure, wherein at least one lanthanum cation of the crystal lattice structure is substituted with a calcium cation prepared by the hydrothermal method described herein. The nanoparticle may have any morphology as long as at least one lanthanum ion is substituted with calcium ion. A preferred embodiment, the nanoparticle has flower-like morphology, a nanogear morphology, and a nanocubic morphology, double-decker-like microhexagrams morphology, spiky balls morphology, triangular hearts morphology, apple-like nanostructures, microspheres, nanowires, the layer-by-layer self-assembly of nanoplates, and combination thereof. A preferred embodiment, the ceramic nanoparticle is selected from the group consisting of flower-like morphology, a nanogear morphology, and a nanocubic morphology. A more preferred embodiment, the ceramic nanoparticle has a flower-like morphology or cubic morphology. An even more preferred embodiment, the ceramic nanoparticle has a nanogear morphology. In the most preferred embodiment, the nanoparticle has an X-ray diffraction pattern consistent with hexagonal crystal with unit cell dimension of a=b=1.26±0.16 nm and c=1.00±0.1 nm. The result of the X-ray diffraction experiment indicates that calcium ions partially and/or totally $La^{+3}$ host lattice site. It should be noted that the ionic radius of calcium ion (0.99 Å) is very similar to that of La ion (1.061 Å). In another embodiment, the nanoparticle has nanogear morphology and a broad fluorescent emission maximum at 399 nm.

The $La(CO_3)OH$ nanoparticles are uniform in shapes and sizes. The average length of the particle is in the range of 0.5-10.0, preferably 1.0-5.0, 1.5-4.0, or 1.5-3.0 μm, and preferably 1.5-2.0 μm. The average thickness of the particle is in the range of 0.20-1.50, preferably 0.30-1.30, 0.4-1.10, 0.5-1.0, 0.6-0.90, or 0.70-0.80 μm, preferably 0.75 μm. The nanoparticles can appear like cubes of ice or prisms resembling nanogears. The cross section of the nanogear can be triangular or circular in shape and has teeth-like structure at the corners of the triangle or the edge of the circle (see for example FIG. 2 (b"), (b'''), (c") and (c'''). The teeth-like structure may contain a plurality of teeth such as two, three, four, five teeth or more, preferably regularly spaced around the circumference of the center portion. In a preferred embodiment, the nanogear has a triangular cross section with two teeth-like structures at the corners of the triangle with a flower-like morphology. By the term "flower-like surface morphology" is meant that the spherical particles are characterized by the presence of individual thin sheets or plates arranged radially like petals, wherein two or more adjacent individual thin sheets are interconnected to form cells or channels which open onto the external surface of said spheres (see the inset of FIG. 2(c")).

A third aspect of the invention is directed to a method of reducing nitrogen oxides such as NO and $NO_2$ in a gas stream to nitrogen with a hydrocarbon. The gas stream may contain any amount of nitrogen oxides. In a preferred embodiment of the invention, the nitrogen oxide is at concentration in the range of 10-10,000 ppm, preferably, in the range of 100-5000 ppm, more preferably, in the range 500-3000, and most preferably in the range of 1000-2000 ppm. The hydrocarbon can be any hydrocarbon such as methane, ethane, propane, propene, butane, isobutane, butene, isobutene, pentane, cyclopentane, cyclopentene, hexane, hexane, cyclohexane, cyclohexene, or any isomer thereof. The gas stream may have water content in the range of 0%-20% water, preferably in the range of 1%-15%, more preferably 1%-10%, and most preferably 2%-10%. Similarly, the stream of gas may contain oxygen in an amount in the range 0%-20%, preferably in the range 5%-15%, and more preferably, in the range 5%-10%. The effect of water on the catalyst is small and reversible (see FIG. 10). The stability and durability of the nanoparticles of the invention in the presence of water and oxygen is particularly advantageous in removing the toxic nitrogen oxide from exhaust gases. It has been shown, as discussed above, that the catalytic activity of other catalyst are compromised in the presence of water. The method may be carried out in a gas reactor, preferably tubular in shape, packed with the ceramic nanoparticle of lanthanum hydroxycarbonate described herein. The gas reactor may be a scrubber unit built into or attached to a smoke stack such as those of power plant and incinerators, or any other exhaust pipe of a motor burning a petroleum product. In a preferred embodiment, the reactor or scrubber unit may be heated at a temperature between 200-800° C. In a more preferred embodiment the reactor is heated to a temperature between 600-660° C. and most preferable to 660° C. Another preferred embodiment of the method, the nitrogen oxide source is an exhaust gas from smoke stacks of power plant, incinerators, automobile exhaust, industrial gases, chemical plant, and the like. The exhaust gas and a hydrocarbon gas such as methane may passed through a bed of lanthanum hydroxycarbonate nanoparticles of the invention. The gas flow in the reactor can be determined by one of ordinary skill in the art and may be expressed as "reactant gas flow rate/reactor volume" or gas hourly space velocity (GHSV)" which may be optimized for each application. In some embodiment, the GHSV may be in the range of 100-15,000 $hour^{-1}$, preferably 500-10,000 $hour^{-1}$, more preferably 1000-5000 $hour^{-1}$, most preferably 2000-3000 $hour^{-1}$, In some instances, the temperature of the exhaust gas is adequate for the catalytic reduction reaction. In some other instances, the bed may be heated to a desired temperature in the range 400-660° C.

The examples below are intended to further illustrate protocols for preparing, characterizing, and using a multiphasic titanium dioxide photocatalyst, and are not intended to limit the scope of the claims.

Example 1

Analytical Methods:

X-ray diffraction (XRD) analyses were performed on a Bruker D8 Advance diffractometer system with an operating voltage of 40 kV and a current of 40 mA by using Cu Kα radiation (λ=1.5405 Å) and a graphite monochromator. The samples were investigated over the 2θ range 10-80° at a scanning speed of 2 $min^{-1}$. Fourier transform infrared (FT-IR) spectra were collected on a Bruker FT-IR spectrometer by using the KBr pellet technique. Thermal gravimetric analysis (TGA) analyses were carried out using a thermogravimetric analyzer (Discovery, TA, USA). A 5.0 mg sample was placed in an aluminum pan and heated from 30 to 600° C. under $N_2$ at a heating rate of 10° C./min. The morphologies and sizes of the resulting products were determined with field emission scanning electron microscopy (TESCAN LYRA3, Czech Republic). TEM images were recorded by using a transmission electron microscope (JEOL, JEM 2011) operated at 200 kV with a 4 k×4 k CCD camera (Ultra Scan 400SP, Gatan). PL measurements were performed with a spectrofluorometer (Fluorolog FL3-iHR, HORIBA Jobin Yvon, France). The chemical compositions of the samples were determined with X-ray photoelectron spectroscopy (XPS) by using an X-ray photoelectron spectrometer (ESCALAB-250, Thermo-VG Scientific) with Al-Kα radiation (1486.6 eV).

Example 2

Hydrothermal Method for the Synthesis of $LaCO_3OH$:

A reaction mixture of $La(NO_3)_3.6H_2O$ Sigma-Aldrich Co.) and $Ca(NO_3)_2.4H_2O$ (Fluka) in a molar ratio of 95:5 is obtained by mixing solutions of $La(NO_3)_3$ and $Ca(NO_3)_2$ dissolved in deionized water. To the reaction mixture, a sufficient amount of $(NH_4)_2CO_3$ solution (4.1 mol/ml, Merck) is added to co-precipitate the metal ions by adjusting the pH to about 8.5. In a typical preparation, 1 ml solution of 6.8 mg (0.029 mmol) of $Ca(NO_3)_2$ in water is added to 15 ml solution of 0.25 g (0.57 mmol) of La(NO$_3$)$_3$.6H$_2$O in water followed by the addition of 0.017 mol (NH$_4$)$_2$CO$_3$ solution. The pH of the reaction mixture is adjusted to about 8.5 with ammonium carbonate and the reaction mixture is incubated and vigorously stirred for 12 hours while maintaining the pH at about 8.5 by adding NH$_3$.H$_2$O (25 wt %) or a HNO$_3$ (1 M) solution. The reaction mixture is transferred to a plastic container with an inner volume of 500 ml, and then the plastic container was inserted into a steel vessel. The mouth of the vessel was closed, and the hydrothermal reactions were performed at 180° C. for more than 48 h, 24 h, and 12 h to produce the samples LC-48, LC-24, and LC-12, respectively. The resulting powders were washed three times with alcohol, deionized water, and dried at 110° C. Using the same procedure, nanoparticles containing molar ratio of La:Ca=80:20, La:Ca=85:15, and La:Ca=90:10 nanoparticles were synthesized. An autoclave with a capacity of 500 mL and a magnetically driven stirrer were used in the hydrothermal reactions.

The resulting powders were washed three times with alcohol, deionized water, and dried at 110° C.

Example 3

Characterization of the Nanoparticles:

(a) X-Ray Diffraction:

FIG. 1 shows the XRD patterns collected from the LC-12, LC-24, and LC-48 as-synthesized samples. The diffraction peaks in these patterns are very similar. The molar ratio of La:Ca=95:5 mol % in all these samples, but they differ in the hydrothermal reaction time. The peak intensities increase as the hydrothermal reaction time increases from 12 h to 48 h; they are very sharp and intense, which indicates higher crystallinity and is in agreement with the SEM observations. All the peaks were slightly broad at the base of the peaks, in particular, for the sample prepared by 12 h reaction time. Moreover, the two split peaks at a two-theta value of 430 have similar intensities [FIGS. 1 (a) and (b)]. The intensity of this split peak increases with increases in the reaction time, and the peak at 43.30 becomes more intense than that at 43.20 [FIG. 1(c)]. The highly crystalline peaks in FIGS. 1 (a), (b), and (c) can be indexed to the pure LaCO$_3$OH hexagonal phase, i.e. to the JCPDS no. 26-0815 reference peaks, with lattice constants of a=b=1.262 nm and c=1.003 nm. No other peaks were observed indicating that the synthesized products have a high phase purity. The XRD patterns clearly demonstrate that well-crystallized LaCO$_3$OH crystals can be readily obtained with the hydrothermal synthetic method. Also, these results indicate that Ca$^{2+}$ ions partially and/or fully occupy La$^{3+}$ host lattice sites, which confirms the results of Liu et al. ["Mesoporous CaO—ZrO$_2$ nanooxides: A novel solid base with high activity and stability", Micro. Meso. Mater. 117 (2009) 466-471]. Note that the ionic radius of Ca (0.99 Å) is very similar to that of La (1.061 Å) indicating that substitution of Ca ions for La ions within the La lattice is facile. The absence of CaO in the phase-pure LaCO$_3$OH could be due to the hampering of CaO crystal growth and/or the high dispersion of CaO. Note that LaCO$_3$OH has generally been prepared with the assistance of templates or catalysts, and their XRD diffraction peaks have been assigned generally to pure hexagonal [Li et al. "Eu$^{3+}$/Tb$^{3+}$-Doped La$_2$O$_2$CO$_3$/La$_2$O$_3$ Nano/Microcrystals with Multiform Morphologies: Facile Synthesis, Growth Mechanism, and Luminescence Properties", Inorg. Chem. 49 (2010) 10522-10535; Yang et al. "LaCO$_3$OH microstructures with tunable morphologies: EDTA-assisted hydrothermal synthesis, formation mechanism and adsorption properties, RSC Adv. 3 (2013) 3907-3916; and Li et al. "Synthesis of LaCO$_3$OH nanowires via a solvothermal process in the mixture of water and room-temperature ionic liquid", Mater. Lett. 59 (2005) 963-965], and sometimes orthorhombic phases [Wang et al. "Preparation and photoluminescence properties of uniform LaCO$_3$OH triangular nanoplates" Mater. Lett. 148 (2015) 114-117; and Pol et al. "Solvent-Free Fabrication of Rare LaCO$_3$OH Luminescent Superstructures", Inorg. Chem. 48 (2009) 6417-6424]. The desired phase is hexagonal because it is more stable at higher temperatures. There have only been three reports of the preparation of LaCO$_3$OH without the assistance of templates or catalysts. Y. Zhong et al. ["Gelatin-mediated hydrothermal synthesis of apple-like LaCO$_3$OH hierarchical nanostructures and tunable white light emission", Cryst. Eng. Comm. 13 (2011) 4151-4160] prepared LaCO$_3$OH with the hydrothermal method at 230° C. without using a template or a catalyst, but the morphology of the particles was not uniform and some irregular particles were observed. Also, Pol et al. ["Solvent-Free Fabrication of Rare LaCO$_3$OH Luminescent Superstructures", Inorg. Chem. 48 (2009) 6417-6424] prepared LaCO$_3$OH by performing a solvent-free, one-pot reaction under autogenic pressure at a high temperature. This process is very expensive because it requires expensive alkoxides, and produces very low yield without a unique morphology. Pan et al. synthesized orthorhombic LaCO$_3$OH photocatalyst by hydrothermal method without any help of catalyst. However, the synthesized particles had no definite shape or size. The particles were merely consists of a mixture of rod and ball like particles [Pan et al. "Synthesis and photocatalytic hydrogen production of a novel photocatalyst LaCO3OH", J. Mater. Chem. A:1, (2013) 6629].

(b) Field Emission Scanning Electron Microscopy (FE-SEM):

The surface morphologies of all samples were examined by using FE-SEM after applying an Au coating. The FE-SEM images in FIGS. 2 (a'-a'''), (b'-b'''), and (c'-c''') are of low to high magnification. The morphology of sample LC-12 [FIG. 2 (a')] is quite different from those of samples LC-24 [(2b')], and LC-48 [(2c')]. The molar ratios of the starting materials La(NO$_3$)$_6$H$_2$O, (NH$_4$)$_2$CO$_3$, water, and Ca(NO$_3$)$_3$.4H$_2$O, the pH, the reaction time, and the temperature are the main influences on the morphologies of the products. We investigated the effects of reaction time at a constant pH of 8.5 with a molar ratio La:Ca=95:5 as shown in FIG. 2. We also investigated the effects of varying the molar ratio of La and Ca at a constant pH of 8.5 in the following section. Note that the particles of sample LC-12 have no definite size or shape. These particles are agglomerated, which indicates that the reaction time has a significant impact on the formation of a unique size and shape. The nanoparticles appear to be slightly melted and the somewhat spherical particles are attached to one another [FIG. 2 (a')]. FIG. 2 (b') shows nanoprisms that have formed a perfect prism-like morphology with a smooth surface. The particles resemble a cubic-type piece of ice and are monodisperse. Note also that all the particles not only have the same morphology but also a similar size and shape. The cubic structure is clearly visible in the TEM images (FIG. 3 (a-a')). The FE-SEM images of sample LC-48 show that it is full of prisms resembling nanogears (FIG. 2 (c''')). LaCO$_3$OH products with an average size of 1.5-2.0 µm length and 0.75 µm thickness are observed by using (NH$_4$)$_2$CO$_3$ and Ca$^+$. The nanogears are clearly visible if we pay close attention to the marked circle in FIG. 2 (c''). Indeed, all the nanogears have a novel cherry-blossom-like structure. Six or more nanogears are evident and probably arise via shrinkage of the prism-like particles. An image of an actual cherry blossom, which is very similar to that of the synthesized nanogears, is shown in the inset in FIG. 2 (c"). Zhang et al. ["Green synthesis of monodispersed LaCO$_3$OH microgears with novel plum blossom-like structure via a glycerol-mediated solvothermal method", RSC Adv. 5 (2015) 21925-21950] reported the preparation of cherry-blossom-like LaCO$_3$OH nanogears with a reaction time of 6 h, however, they used a high concentration of glycerol and urea. Herein, with changes in the reaction time from 12 h to 24 h to 48 h the morphology changed from agglomerated spherical to monodisperse cubic and then to nanogears, as shown in FIG. 2; crystallization improves for longer hydrothermal reaction times.

(c) Transmission Electron Microscopy (TEM):

The TEM image of the LC-24 sample shows that is has a clear morphology with a cubic structure [FIG. 3 (a)]. A shadow cubic morphology can also be seen in the same TEM figure. In contrast, the TEM image of the LC-48 sample shows that it contains a single cherry-blossom-like nanogear crystal. The nanogears are composed of several thick teeth [FIG. 3 (b)]. The properties of both samples are consistent with the SEM results. HRTEM images of the LC-24 and LC-48 samples (FIGS. 3(a) and (b)) contain long-range-order lattice fringes. The selected area electron diffraction (SAED) patterns obtained from the nanogears of the LC-24 and LC-48 samples are shown in FIGS. 3 (a') and (b'), respectively. The measured interplanar spacings for the LC-48 and LC-24 samples of 0.366 nm and 0.316 nm respectively are in good agreement with the d-spacings of the (3030) and (0330) planes of hexagonal LaCO$_3$OH. The spatial arrangements of the spots in the SAED images reveal a set of lattice planes derived from a single hexagonal crystal with its [0001] direction oriented toward the direction of the electron beam.

The rings are discontinuous rather than full, which indicates the presence of an oriented crystallographic axis. Furthermore, the highly ordered bright spots in the SAED pattern (see the inset in FIG. 3 (b')) indicate the formation of well-grown single crystallites.

(d) FTIR:

FIG. 4 presents the FTIR spectra of the as-synthesized (a) LC-12, (b) LC-24, and (c) LC-48 samples. Very weak absorption peaks were observed at 3616 and 3476 cm$^{-1}$, possibly due to structural OH groups and H$_2$O adsorbed onto the nanomaterials respectively. These two weak peaks of LaCO$_3$OH with hexagonal structure were assigned in many open literatures [Zhang et al. "Green synthesis of monodispersed LaCO$_3$OH microgears with novel plum blossom-like structure via a glycerol-mediated solvothermal method", RSC Adv. 5 (2015) 21925-21950; Wang et al. "Selective Synthesis and Characterization of Nanocrystalline EuF3 with Orthorhombic and Hexagonal Structures", Cryst. Growth Des. 6 (2006) 1972-1974]. The OH bands are not stronger probably due to the presence of low amount of physically absorbed water with the compound. In fact, no weight loss was observed up to 350° C. during the TG analysis. The other strong peaks in the range 1495-1436 cm$^{-1}$ are attributed to the $v_3$ mode of carbonate, and the minor bands at 1086-872, 843, and 776-705 cm$^{-1}$ are assigned to carbonate ion $v_1$, $v_2$, and $v_4$ modes, respectively [Wang et al.]. The weak feature at 683 cm$^{-1}$ is due to the $-\delta_{OH}$ bending mode vibrations of water molecules. The three FTIR spectra are similar, except for the peaks below 1000 cm$^{-1}$. The spectrum of LC-48 (FIG. 4 (c)) confirms that the nanogears are composed of La(CO$_3$)OH. Y. Zhang et al. reported a similar IR pattern for a hexagonal LaCO$_3$OH sample. The spectrum of the LC-12 sample contains five weak peaks below 1000 cm$^{-1}$ (FIG. 4 (a)), does not contain an absorption peak at 683 cm$^{-1}$, and the band at 846 cm$^{-1}$ is very weak. A very weak band is present at 2360 cm$^{-1}$ only in the LC-48 spectrum, and is possibly due to the characteristic bands of the CO$_2$ deformation mode.

(e) Surface Composition and Oxidation State:

The surface compositions and oxidation states of the samples were characterized by using XPS. FIG. 5 shows the XPS spectra of the LC-48 sample. The XPS spectrum of FIG. 5 (a) reveals the presence of La, Ca, oxygen, and carbon impurities, with no other elements, on the LC-48 surface. These results are in good agreement with the EDS results. The main peaks (corresponding to the 3d°4f° configuration) of La 3d$_{5/2}$ and La 3d$_{3/2}$ with shake-up peaks (the 3d° 4f$^1$ configuration) are at 836.2 and 853.2 eV respectively, as shown in FIG. 5 (b). These peaks are due to the La(III) oxidation state. Two broad peaks are evident in the Ca 2p region at 351 and 347 eV for the LC-48 sample, which indicates the presence of Ca in LC-48, i.e., in the LaCO$_3$OH compound.

The present disclosure describes a synthetic method based on the control of the La and Ca molar ratio for the fabrication of a phase-pure LaCO$_3$OH nanogear structure. A broad O 1s XPS peak corresponding to lattice oxygen is present at 531.5 eV in the spectrum of the as-prepared sample [Xia et al. "Morphology-Controllable Synthesis and Characterization of Single-Crystal Molybdenum Trioxide, J. Phys. Chem. B, 110 (2006) 2006-2012]. The two peaks at 289.6 eV and 284.60 eV in the C is spectrum (FIG. 5 (e)) were assigned to carbonate and carbon contamination respectively. The electron binding energy of C is at 289.60 eV was assigned to the C—O peak.

The effect of experimental parameters on the morphology of LaCO$_3$OH was examined. Most of the reported unique morphologies of LaCO$_3$OH have been obtained using organic additive. Li et al. ["Eu$^{3+}$/Tb$^{3+}$-Doped La$_2$O$_2$CO$_3$/La$_2$O$_3$ Nano/Microcrystals with Multiform Morphologies: Facile Synthesis, Growth Mechanism, and Luminescence Properties", Inorg. Chem. 49 (2010) 10522-10535] investigated the effects of using NaHCO$_3$, NH$_4$HCO$_3$, Na$_2$CO$_3$, (NH$_4$)$_2$CO$_3$, and CO(NH$_3$)$_2$ as carbon sources and found that the XRD peaks of all samples could be indexed as the pure orthorhombic LaCO$_3$OH phase, which indicates that using a different carbon source does not change the crystal phase of the product. This was not true after an addition of small amount of Ca$^{2+}$ in the present study. In this study, we obtained a pure hexagonal LaCO$_3$OH phase instead of orthorhombic with a unique cherry blossom morphology by keeping all other parameters are fixed. Of course, the reaction temperature had a significant influence on the crystal phase formation and the morphology. By increasing the reaction time i.e., more than 20 h, nanogears are more visible under hydrothermal reaction conditions. Which is completely different in presence of a polymer additive during the synthesis of nanogears LaCO$_3$OH [Zhang et al. RSC Adv. 5 (2015) 21925-21950]. Thus, Ca$^{2+}$ plays a significant role for both the phase and new morphology formation. The morphology of molybdenum trioxide was also controlled using Ca(NO$_3$)$_2$ and La(NO$_3$)$_3$ via a facile hydrothermal method [Kanari et al. "Thermal decomposition of zinc carbonate hydroxide", Thermochim. Acta 410 (2004) 93-100]. The effect of Ca$^{2+}$ content was examined on morphology of other molar ratios of La:Ca for example La:Ca=90:10, La:Ca=85:15, and La:Ca=80:20 samples under the same hydrothermal conditions [FIG. 6]. It is interesting to note that only 5 mol % of $Ca^{2+}$ is sufficient to produce nanogears having several thick teeth (FIG. 2). All three samples have similar agglomerated spherical morphologies, and their XRD diffraction pattern indicate they have phase-pure hexagonal structure. Also, La: alkaline metal ions of $Na^+$ and $K^+$ molar ratio of 95:5 mol % were examined by keeping all other parameters are fixed. Neither the nanogears morphology nor the hexagonal $LaCO_3OH$ is observed indicating that the $Ca^{2+}$ played a structure-determining factor similar to polymers additive or catalyst used in the previous studies. In fact, alkaline metal ions can direct the growth of nanoparticles into different shapes [Li et al. "Non-isothermal kinetics studies on the thermal decomposition of zinc hydroxide carbonate", Thermochim. Acta 438 (2005) 102-106]. A similar phenomenon might occur here due to the presence of $Ca^{2+}$. The reaction mechanism for the formation of $LaCO_3OH$ could be written as follows.

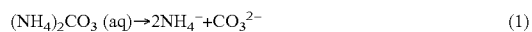  (1)

  (2)

  (3)

  (4)

In contrast to urea, the carbon source, i.e., $(NH_4)_2CO_3$ is completely ionized and solvated in water as $NH_4^+$ and $CO_3^{2-}$ ions which provides a good quantity of $CO_3^{2-}$ and $OH^-$ ions. Most of the $NO_3^-$ was washed off during cleaning step. The strong affinity between $La^+$ and $CO_3^{2-}$ was led to the formation of $LaCO_3$ [Gaines et al. (1997) Dana's New Mineralogy, 8th ed, John Wiley & Sons: New York, Class 15 and 16]. Initially, the particles growth rate was faster along an axis due to the presence of high concentration of $CO_3^{2-}$ and $OH^-$, according to the proposed mechanism by Peng et al. ["Shape control of CdSe nanocrystals", Nature, 404 (2000) 59-61], and $Ca^{2+}$ might be absorbed at the same time on the $LaCO_3$ crystal faces, which hinder the rod-like particles formation. Also, the presences of $CO_2$ and $NH_3$ micro-gas bubbles in the growth process may lead to tiny gaps on the surface and on the inner portion of the nanogears. Consequently, the $Ca^{2+}$ absorption is enhanced and $Ca^{2+}$ ions penetrate in different direction. Finally, the overall growth rate could be slow under hydrothermal conditions and this situation favored the cherry blossom type short size nanogears morphology formation.

Figure 7:
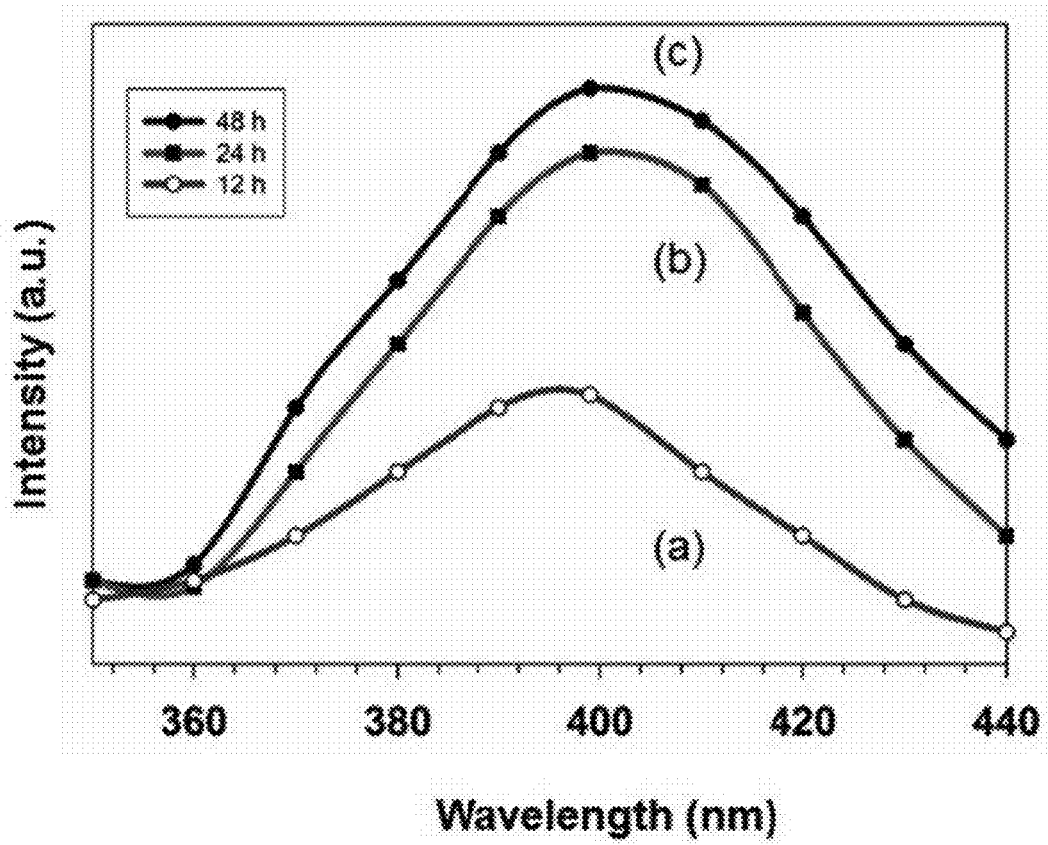
FIG. 7. Photoluminescence spectra (excited by $\lambda_{ex}$=280 nm) of (a) LC-12, (b) LC-24, and (c) LC-48 samples at room temperature.

(d) Luminescence Properties of the Nanoparticles:

The effects of morphology/crystallinity on the photoluminescence (PL) emission intensities were examined. FIG. 7 shows a comparison of the room temperature luminescence intensities of the samples LC-12, LC-24, and LC-48. Upon excitation at 280 nm, the emission spectra of all samples contain only one broad band maximum at approximately 399 nm. All products produce blue emission. The emission spectra of the LC-24 and LC-48 samples contain a broad band located between 380 and 420 nm that can be attributed to self-trapped exciton (STE) luminescence [Chen et al. "Synthesis and characterization of $La_{0.825}Sr_{0.175}MnO_3$ nanowires", J. Phys. Condens. Matter. 17 (2005) L467-L475]. The PL properties of the LC-24 and LC-48 samples are identical with previous literatures [Li et al. "$Eu^{3+}/Tb^{3+}$-Doped $La_2O_2CO_3/La_2O_3$ Nano/Microcrystals with Multiform Morphologies: Facile Synthesis, Growth Mechanism, and Luminescence Properties", Inorg. Chem. 49 (2010) 10522-10535, and Zhang et al. "Green synthesis of monodispersed $LaCO_3OH$ microgears with novel plum blossom-like structure via a glycerol-mediated solvothermal method", RSC Adv. 5 (2015) 21925-21950]. The interior electron transitions of the 4f shell are typically responsible for the fluorescence of rare-earth ions; however, the 4f shell of $La^{3+}$ is vacant. Therefore, no f-f transitions are possible in $LaCO_3OH$ powders [Li J Y, (2003) Luminescent Materials of Rare Earths and Their Applications, Chemical Industry, Beijing 8]. In the present disclosure, a broad emission band at 399 nm is produced by the $LaCO_3OH$ nanogears upon 280 nm excitation, without using a filter, which corresponds to deep level or STE luminescence [Chen et al. Synthesis and characterization of $La_{0.825}Sr_{0.175}MnO_3$ nanowires, J. Phys. Condens. Matter. 17 (2005) L467-L475]. Also, Zhang et al. (RSC Adv. 5 (2015) 21925-21950) observed similar PL emission in $LaCO_3OH$ microspheres upon excitation at 438 nm. Lattice irradiation generates several free holes and free electrons, and then STEs form directly from electron-hole pairs. The luminescence spectrum arises because of the diffusion of the STEs via nonradiative recombination [Pei et al. "Growth and luminescence characteristics of undoped $LaCl_3$ crystal by Modified Bridgman Method, J. Cryst. Growth 279 (2005) 390-393]. The emission spectra of the three samples are similar in shape and differ under identical measurement conditions only in their relative intensities. In particular, the relative emission intensity of the nanogears (reaction time 48 h) is higher than that of the cubic particles (reaction time 24 h). In general, the photoluminescence emission intensity of a material is strongly correlated with its morphology and crystallization.

Example 4

Catalytic Activity of Nanoparticles:

Method of Reduction of Nitrous Oxide:

A pyrex glass tubular reactor with an internal diameter of 12 mm was used in the catalytic performance tests. The nanoparticles samples were retained between glass wool plugs in the reactor. The gas flow rate is controlled with a mass flow controller at predetermined flow rate. A 4-channel electronic mass-flow controller was used to fix the total flow rate at a constant value. The furnace temperature was increased at a linear heating rate of approx. 10 $Kmin^{-1}$ with a computer-based temperature controller. Before performing the tests, the total system was activated by increasing the temperature from 200 to 800° C. under real feed conditions. Data was collected during cooling from 700 to 200° C. every 60° C. after 40 min stabilization at each selected temperature point. During the $H_2O$ vapor test, 10% $H_2O$ vapor was inserted into the gas mixture with a micro-pump. The catalytic activities were determined in a flowing gas containing 1000-2000 ppm NO, 5% $O_2$, and 2-10% $H_2O$ diluted in He; catalysts weight 0.18 g; GHSV (gas hour space velocity): 2000 $h^{-1}$. Gas chromatography and a molecular sieve were used to analyze the effluent gas at intervals of 20 min. By using an empty catalyst test station, an experiment was performed by flowing the original feed to verify that no $NO_x$ reduction occurs in the absence of catalyst.

NO and hydrocarbon conversion were calculated based on the hydrocarbon intake to obtain the NO reduction percentage. The NO conversion and the hydrocarbon conversion to $CO_x$ ($CO+CO_2$) were calculated based on the following expressions. The percentage error in the calculation data should be less than 2%.

$$NO \text{ conversion to } N_2 \text{ (\%)} = \{2[N_2]/[NO]^{in}\}100$$

$$CH_4 \text{ conversion to } CO_2 \text{ (\%)} = \{(\frac{1}{2})[CO_2]/[CH_4]^{in}\} \times 100$$

$$C_3H_6 \text{ conversion to } CO_2 \text{ (\%)} = \{(\frac{1}{3})[CO_2]/[C_3H_6]^{in}\} \times 100$$

The $3^{rd}$ bracket denotes the feed concentration, and $[NO]^{in}$, $[CH_4]^{in}$ or $[C_3H_6]^{in}$ are the initial concentrations of NO, $CH_4$ or $C_3H_6$ respectively. $[N_2]$ and $[CO_2]$ are the final (after testing) concentrations of $N_2$ and $CO_2$.

Figure 8:
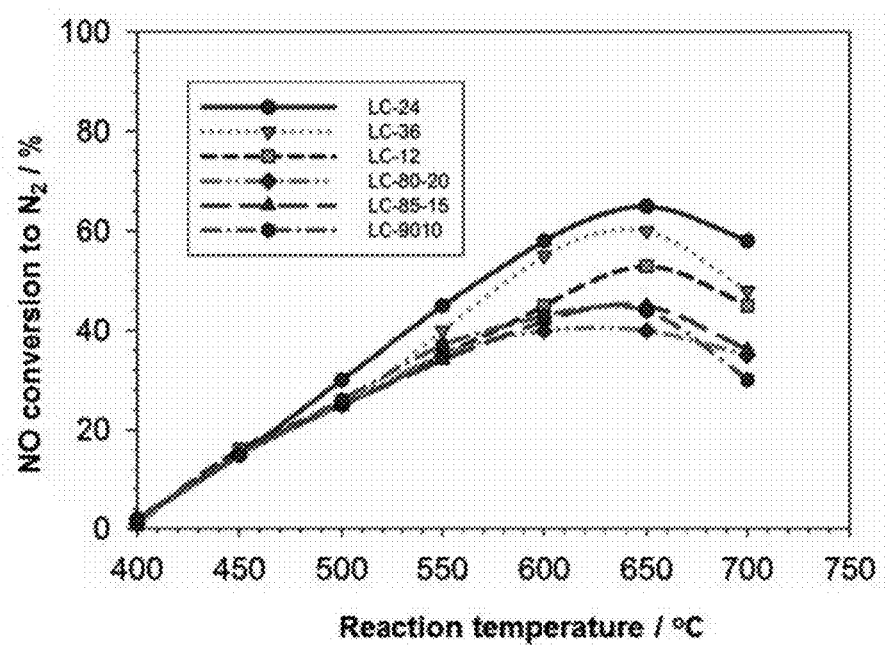
FIG. 8. LC-12, LC-24, and LC-36 powders having La:Ca=95:5 mol % as well as La:Ca=90:10, La:Ca=85:15, and La:Ca=80:20-catalyzed reduction of NO by methane as a function of temperature. All samples were prepared by hydrothermal method at 180° C. and then heat treated 800° C. for 2 h. The reactions proceeded with a feed consisting of NO=1000 ppm, $CH_4$=2000 ppm, and $O_2$=5% diluted in He; catalyst weight=0.18 g; GHSV: 20000 $h^1$.
Figure 11A:
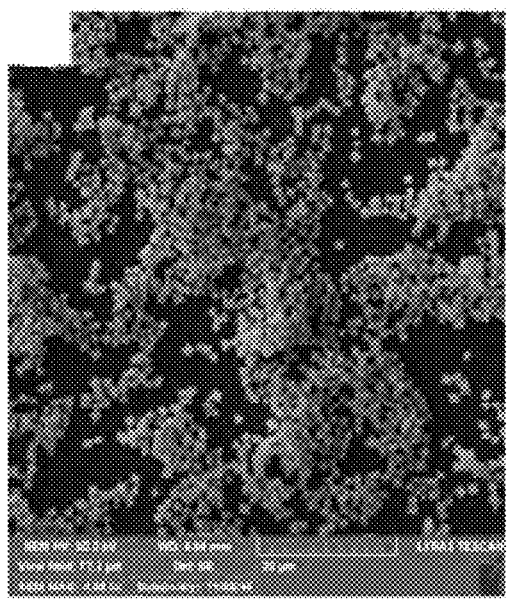
FIGS. 11a and 11b. Typical SEM images of as-prepared LC-24 powders (FIG. 11a) hydrothermal (FIG. 11b) co-precipitation method.
Figure 11B:
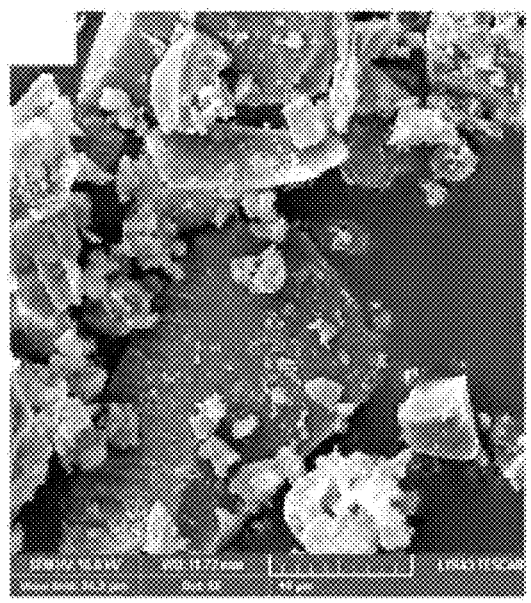

FIG. 8 shows the NO reduction activity of (*a*) LC-12 (*b*) LC-24, LC-36 powders (prepared hydrothermally with the composition of $La_2O_3$:CaO=95:5 mol %) with $CH_4$ as function of reaction temperature. The NO reduction activity for other molar ratios of La:Ca for example La:Ca=90:10, La:Ca=85:15, and La:Ca=80:20 samples prepared under the same hydrothermal conditions as mentioned in FIG. 6 for the purpose of comparison. NO reduction begins at approximately 400° C. The NO reduction by $CH_4$ increases with increasing the temperature and reaches its highest activity in the range 600-660° C. NO reduction by $CH_4$ with high NO conversion of more than 65% was observed for LC-24 sample in the temperature range of 600-670 C. As the temperature increased to above 660° C., the conversion of NO began to decline for all tested samples. The LC-36 sample also maintains high reduction activity at 650° C. The high activity of LC-24 was observed probably due to the nanocube particles with homogeneous distribution, same size, smooth surface and unique morphology. Moreover, the methyl radical production had significant impact for the NO reduction with $CH_4$. Typical SEM images of LC-24 powders prepared by co-precipitation and hydrothermal are shown in FIG. 11. Very beautiful flower type particles were formed by hydrothermal reaction; however, very rough morphology with large grains can be seen for the samples prepared by co-precipitation. The particle size of samples synthesized by co-precipitation had a broad distribution of 0.5-1000 μm, however, unique uniform nanocubes were formed by hydrothermal method [FIG. 11].

Figure 12:
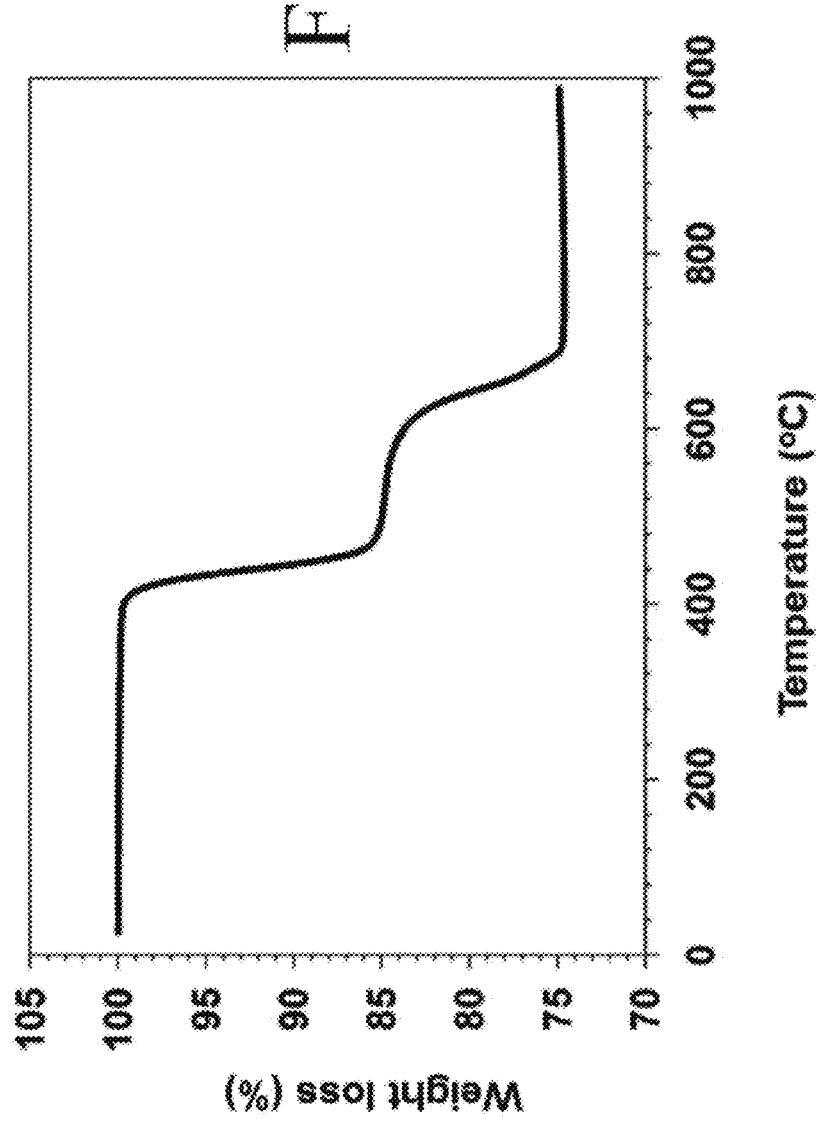
FIG. 12. The TG curve of hydrothermally prepared LC-24 nanocubes powders.

Both samples had very low surface area but their particles size, shape and surface morphologies were very different. Costa et al. ["The Selective Catalytic Reduction of Nitric Oxide with Methane over $La_2O_3$—CaO Systems: Synergistic Effects and Surface Reactivity Studies of NO, $CH_4$, $O_2$, and $CO_2$ by Transient Techniques", J. Catal. 194 (2000) 250-265] reported very low surface area of 7 $m^2/g$ for the same La—Ca (95-5 wt %) sample after heat treatment at 300° C., although the NO reduction activity was performed in the 400-800° C. range. They prepared the La—Ca (95-5 wt %) sample by mixing two oxide powders at 60° C. On the other hand, hydrothermally prepared LC-24 nanocubes were prism like particles and no physical water molecules were attached as evidenced by very weak OH group in the FTIR spectra [FIG. 4]. Weight loss was not observed up to 480° C. during the TGA analysis [FIG. 12]. These characteristics had some positive impact for the higher catalytic activity. The effect of crystalline phases obtained after hydrothermal as well as physically mixed oxide method will be discussed in the following section.

NO reduction activities were slightly decreased in the case of La:Ca=90:10, La:Ca=85:15, and La:Ca=80:20 samples. The low activity of La:Ca=90:10, La:Ca=85:15, and La:Ca =80:20 samples probably due to agglomerated morphology with undefined structure as shown in FIG. 6. In fact, aggregated large particles were observed due to aggregation during the NO reduction activity and/or heat treatment of LC-90-10, LC 85-85-15, and LC-80-20. Another possible reason for lower performance of LC-90-10, LC 85-85-15, and LC-80-20 samples probably because of their higher hydrocarbon oxidation activity by oxygen proceeds predominantly over these catalysts, which is a side reaction consuming hydrocarbon.

Figure 9:
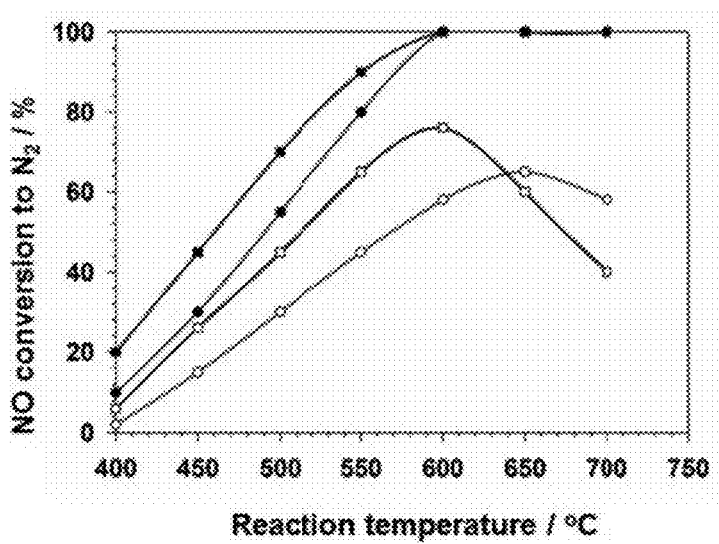
FIG. 9. Reduction of NO by 2000 ppm $CH_4$ and 2000 ppm $C_3H_6$ on LC-24 as a function of reaction temperature. Solid symbols ●=$CH_4$ conversion, ■=$C_3H_6$ conversion, o=NO conversion by $CH_4$, □=NO conversion by $C_3H_6$. The reaction conditions are the same as in FIG. 8.

The catalytic activity of LC-24 catalysts was tested using two types of reducing agent $CH_4$ and $C_3H_6$ in the presence of oxygen [FIG. 9]. NO reduction increased for both reducing agents with increasing temperature. NO conversion with $C_3H_6$ was slightly higher at lower temperatures compared to $CH_4$ as shown in FIG. 9. It is known that as the carbon number increases, NO reduction shifts to the lower temperature region [Zahir et al. "Hydrothermal synthesis of ZnO—$Ga_2O_3$—$Al_2O_3$ spinel for NO reduction by hydrocarbon under oxygen-rich conditions, Catal. Lett. Vol. 93 (2004) 145-148].

Figure 10:
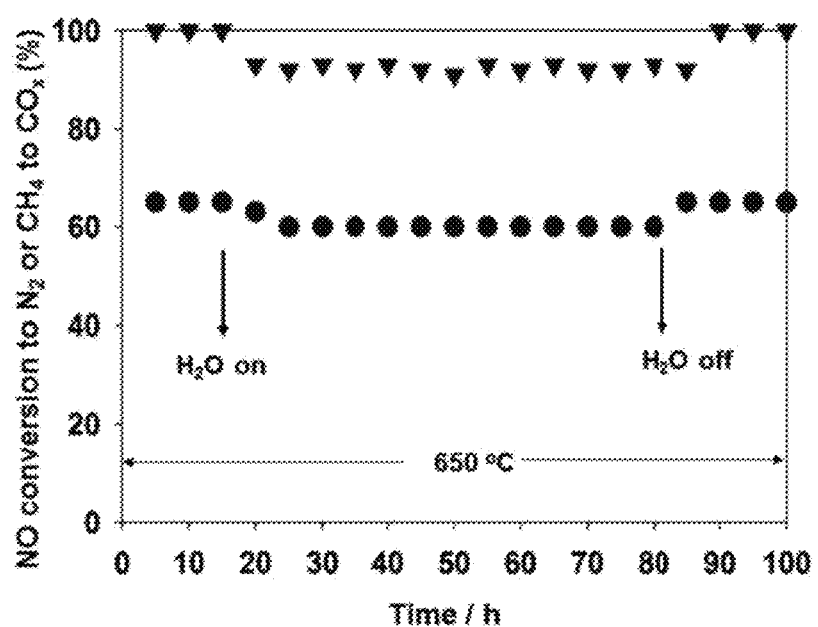
FIG. 10. Durability in the presence of $H_2O$ vapor of LC-24 nanocubes type powders prepared by hydrothermal method. The reaction was carried out in a feed consisting of NO=1000 ppm, $CH_4$=2000 ppm, $O_2$=5%, $H_2O$ vapor=10%, diluted with He. GHSV: 20000 $h^{-1}$ at 650° C. Solid symbols ●=NO conversion, ▼=$CH_4$ conversion.

Effect of Water on the Catalytic Activity of Nanoparticles:

The exhaust gas is mainly consists of NO, $NO_2$, $CO_2$, CO, $H_2O$ and $O_2$. Most of the cases the catalytic activity decreased severely in the presence of $H_2O$ vapor (Zahir et al.). Therefore, we have tested the performance of LC-24 powders in presence of $H_2O$ vapor; however, it was observed that the obstructing effect of 10% $H_2O$ in the feed stream is small as shown in FIG. 10. After addition 10% $H_2O$ vapor, the NO conversion was decreased by only 5% indicating that the effect was fully reversible. NO conversion was decreased in the presence of $H_2O$ vapor but restored when the $H_2O$ vapor supply switch was turn off. Thus, the LC-24 catalyst exhibits good stability in the presence of $H_2O$ vapor under the present reaction conditions. The ability to withstand $H_2O$ vapor characteristics was driven from their elimination ability of surface carbonaceous materials deposited on the catalytically active site [Zahir et al. Catal. Lett. Vol. 93 (2004)145-148].

Figures 13A, 13B, 13C:
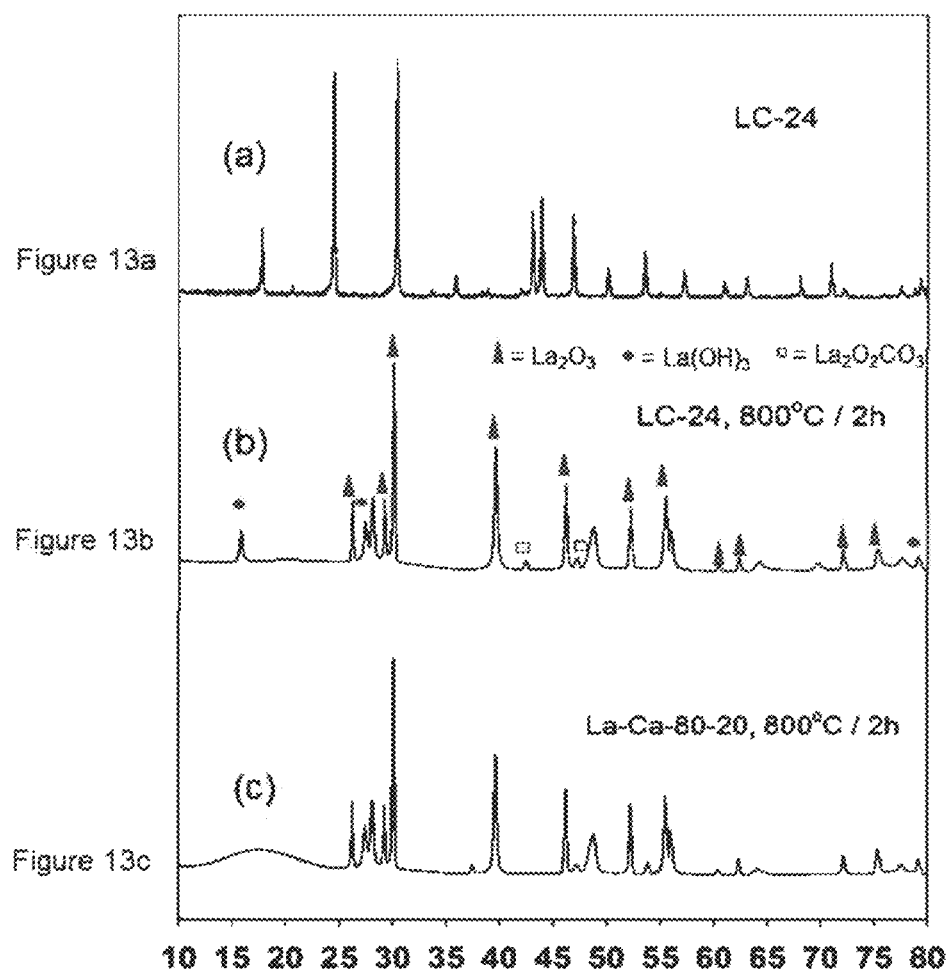
FIG. 13a-13c.

The XRD pattern shows the presence of mostly hexagonal $La_2O_3$ (JCPDS 05-0602) phase after heat treatment the $LaCO_3OH$ sample i.e., LC-24 nanocube powders. The final products were pure $La_2O_3$, a mixture $La_2O_3$ of $La(OH)_3$ and small amount of $La_2O_2CO_3$, which were characterized by XRD shown in FIG. 13 *a-c*, respectively. The calcined LC-24 powders gave the hexagonal $La_2O_2CO_3$ (JCPDS Card No. 37-0804) at 600° C., as reported by Mao et al. ["Selective Synthesis of morphology and species controlled $La_2O_3$:$Eu^{3+}$ and $La_2O_2CO_3$:$Eu^3$ phosphors by hydrothermal method". J. Electrochem. Soc. 159 (2012) J48-J53]. $LaCO_3OH$ decomposed to $La_2O_3$ through $La_2O_2CO_3$. $LaCO_3OH$ was first transformed into $La_2O_3$ through calcination at 800° C. for 2 h, and then cooled with a high relative humidity of 40% for 3 h. Then $La_2O_3$ would further change into $La(OH)_3$ via a hydrolysis process. It is important to note that our laboratory is situated highly humid area in the world i.e., Dammam city, Saudi Arabia. Of course, we obtain $La_2O_3$, after calcination $LaCO_3OH$ in vacuum. Also, Xie et al. [Biomolecular-Induced Synthesis of Self-Assembled Hierarchical $La(OH)CO_3$ One-Dimensional Nanostructures and Its Morphology-Held Conversion toward $La_2O_3$ and $La(OH)_3$, Cryst. Growth Des. 9 (2009) 3889-3897] examined the effect of the humidity of air during the cooling process of $LaCO_3OH$ sample. They also observed humidity impact over the $LaCO_3OH$ sample, synthesized by hydrothermal method using $La_2O_3$ and glycine as the starting materials. Costa et al. [J. Catal. 194 (2000) 250-265]. observed CaO, $La_2O_3$, $CaCO_3$, $Ca(OH)_2$, and $La_2O_2CO_3$ crystalline phases using $L_2O_3$ and CaO (95-5 wt %) mixed oxide powders after heat treatment at 800° C. for 2 h. This is quite different from that of hydrothermally synthesized $Ca^{2+}$ doped and/or containing $LaCO_3OH$ and their crystalline phases after heat treatment 800° C. for 2 h. $La_2O_3$ and CaO are the most active phases for NO reduction by $CH_4$. The high catalytic activity was observed might be due the presence of mostly $La_2O_3$ phase. Moreover, highly dispersed CaO or doped $La_2O_3$ phase probably playing crucial role for higher catalytic activity. CaO reacts readily with $CO_2$ to form various kinds of surface carbonate species and bulk $CaCO_3$ as well. In fact, $CO_2$ a reaction product form stable adsorbed carbonate-like species, lowering the reduction rate of NO. In this disclosure, the high $H_2O$ resistance catalytic performance was observed might be due to the absence and/or less amount of CaO, $CaCO_3$ and $Ca(OH)_2$ phases [FIG. 13 (b)], which are mainly carbon generating species. It should be noted that $Ca(OH)_2$ or $La(OH)_3$ phases are must be absent at 800° C.

La was used for the preparation of luminescent and catalyst materials. La mineral resources are plentiful and $La_2O_3$ is relatively cheap in comparison to other rare earth minerals. Although the supply of La remains in excess of demand in the RE industry, the availability of La-based materials are still scarce. Herein is described the synthesis of $LaCO_3OH$ with cubic and nanogear-type morphologies that does not require the assistance of templates or catalysts. The large-scale production of phase-pure hexagonal $LaCO_3OH$ is achieved by using a simple and environmentally friendly hydrothermal method. This synthesis route provides a general approach to the synthesis of rare-earth compounds with a variety of morphologies and properties. High durability was observed for the reduction of NO by $CH_4$ in the presence of water vapor, maintaining a high stability over 100 h.

The invention claimed is:

1. A method of forming lanthanum hydroxycarbonate nanoparticles having a crystal lattice structure, wherein at least one lanthanum cation of the crystal lattice structure is substituted with a calcium cation, said method comprising:
hydrothermally treating an aqueous reaction mixture comprising water, a calcium salt, a lanthanum salt, and an ammonium carbonate salt at a temperature of 120 to 250° C. for a time of 12-60 hours to form the ceramic nanoparticles, wherein a molar ratio of lanthanum to calcium is in the range of 80:20 to 99:1.

2. The method of claim 1, wherein the aqueous hydrothermal reaction mixture does not contain a templating agent or a catalyst, and wherein the aqueous hydrothermal reaction mixture has a pH in the range of 7.5 to 10.0.

3. The method of claim 1, wherein the molar ratio of lanthanum to calcium is in a range 80:20 to 95:5.

4. The method of claim 1, wherein the molar ratio of lanthanum to calcium is 95:5.

5. The method of claim 1, wherein the crystal lattice is hexagonal.

6. The method of claim 5 wherein the hexagonal crystal lattice has a unit cell dimension of unit cell dimension of a=b=1.26±0.16 nm and c=1.00±0.1 nm.

7. The method of claim 1, wherein the ammonium carbonate salt is at least one selected from the group consisting of ammonium carbonate, alkylammonium carbonate, dialkylammonium carbonate, and trialkylammonium carbonate, and wherein the alkylgroup is at least one selected from the group consisting of methyl, ethyl, propyl, isopropyl, butyl, and isobutyl.

8. The method of claim 1, wherein the temperature is in a range of 120-200° C.

9. The method of claim 1, wherein the time is in a range of 12-48 hours.

10. The method of claim 1, wherein the molar ratio of lanthanum to calcium is in the range 80:20 to 95:5, the ammonium salt is ammonium carbonate, and the time is in a range 12-48 hours.

11. The method of claim 1, wherein the nanoparticles have morphology of nanogear with a cherry-blossom-like structure or a nanocube.

12. A ceramic nanoparticle of lanthanum hydroxycarbonate produced by the method of claim 1.

13. A ceramic nanoparticle of lanthanum hydroxycarbonate produced by the method of claim 7.

14. A ceramic nanoparticle, comprising:
lanthanum hydroxycarbonate with a crystal lattice structure, wherein at least one lanthanum cation of the crystal lattice structure is substituted with a calcium cation, wherein a molar ratio of lanthanum to calcium is in the range of 80:20 to 99:1.

15. The ceramic nanoparticle of claim 14, wherein the molar ratio of lanthanum to calcium in the nanoparticle is selected from the group consisting of 80:20, 85:15, 90:10, and 95:5.

16. The ceramic nanoparticle of claim 14, which has a pure hexagonal crystal lattice.

17. The ceramic nanoparticle of claim 16, wherein the hexagonal crystal lattice has a unit cell dimension of unit cell dimension of a=b=1.26±0.16 nm and c=1.00±0.1 nm.

18. The ceramic nanoparticle of claim 13, which has a morphology selected from the group consisting of a flower-like morphology, a nanogear morphology, and a nanocubic morphology.

19. The ceramic nanoparticle of claim 14, wherein the nanoparticle has a nanogear morphology.

20. A method of catalytically reducing a nitrogen oxide or mixture of nitrogen oxides in the presence of the ceramic nanoparticles of claim 12 and a hydrocarbon, the method comprising:
passing a gaseous stream comprising the nitrogen oxide or mixture of nitrogen oxides and at least one compound selected from the group consisting of methane, propane, oxygen, water vapor, air, and helium through the ceramic nanoparticles at a temperature of 200 to 800° C., thereby reducing the nitrogen oxide.

* * * * *